US012533495B2

(12) United States Patent
Darbellay et al.

(10) Patent No.: US 12,533,495 B2
(45) Date of Patent: Jan. 27, 2026

(54) ENHANCED TORQUE STEERABLE GUIDEWIRE

(71) Applicant: Ecole Polytechnique Federale de Lausanne (EPFL), Lausanne (CH)

(72) Inventors: Colin Darbellay, La Sarraz (CH); Guillaume Petitpierre, Veyrier (CH); Marc Boers, Borex (CH); Pascal Mosimann, Chardonne (CH); Philippe Renaud, Preverenges (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 870 days.

(21) Appl. No.: 17/605,770

(22) PCT Filed: Apr. 21, 2020

(86) PCT No.: PCT/IB2020/053768
§ 371 (c)(1),
(2) Date: Oct. 22, 2021

(87) PCT Pub. No.: WO2020/217171
PCT Pub. Date: Oct. 29, 2020

(65) Prior Publication Data
US 2022/0211981 A1 Jul. 7, 2022

(30) Foreign Application Priority Data

Apr. 24, 2019 (WO) ................ PCT/IB2019/053385

(51) Int. Cl.
*A61M 25/09* (2006.01)
*A61M 25/01* (2006.01)

(52) U.S. Cl.
CPC ........ *A61M 25/09* (2013.01); *A61M 25/0138* (2013.01); *A61M 25/0147* (2013.01);
(Continued)

(58) Field of Classification Search
CPC .......... A61M 25/0054; A61M 25/0147; A61M 25/09; A61M 25/0138;
(Continued)

(56) References Cited

U.S. PATENT DOCUMENTS 3,547,103 A 12/1970 Cook
4,757,827 A 7/1988 Buchbinder et al.
(Continued)

FOREIGN PATENT DOCUMENTS

AU 0208618 B2 10/2014
WO 02/053221 A1 7/2002
(Continued)

OTHER PUBLICATIONS

International Search Report Corresponding to PT.IB2020/053768 mailed Sep. 23, 2020.
(Continued)

*Primary Examiner* — Devin B Henson
(74) *Attorney, Agent, or Firm* — Finch & Maloney PLLC

(57) ABSTRACT

The invention provides for a steerable guidewire for insertion into a body cavity, characterized in that is comprises an elongated body defining a longitudinally-arranged lumen comprising i) a proximal end portion and ii) a distal end portion comprising a spatially reconfigurable portion and a tip; a pull wire located along said lumen and affixed to said distal end portion and to said proximal end; an actuation region located on said proximal end portion adapted to impart a tension force on the pull wire resulting in a compression force to the spatially reconfigurable region; and an intermediate region tubular element on said body located between said spatially reconfigurable portion and said proximal end.

19 Claims, 20 Drawing Sheets

(52) U.S. Cl.
CPC .............. *A61M 2025/09075* (2013.01); *A61M 2025/09116* (2013.01); *A61M 2025/09166* (2013.01)

(58) Field of Classification Search
CPC ......... A61M 2025/09075; A61M 2025/09116; A61M 2025/09166; A61M 25/0136
See application file for complete search history.

(56) References Cited

U.S. PATENT DOCUMENTS

| | | | |
|---|---|---|---|
| 5,203,772 | A | 4/1993 | Hammerslag et al. |
| 5,329,923 | A * | 7/1994 | Lundquist ......... A61M 25/0147 607/122 |
| 6,575,931 | B1 | 6/2003 | Ponzi |
| 6,663,577 | B2 | 12/2003 | Jen et al. |
| 6,682,493 | B2 | 1/2004 | Mirigian |
| 6,755,794 | B2 | 6/2004 | Soukup |
| 6,907,298 | B2 | 6/2005 | Smits et al. |
| 7,182,769 | B2 | 2/2007 | Ainsworth et al. |
| 7,374,553 | B2 * | 5/2008 | Koerner ............ A61M 25/0043 604/95.04 |
| 7,878,984 | B2 | 2/2011 | Jacobsen et al. |
| 7,892,186 | B2 | 2/2011 | Soukup et al. |
| 8,100,838 | B2 | 1/2012 | Wright et al. |
| 8,382,786 | B2 | 2/2013 | Besselink et al. |
| 8,444,577 | B2 | 5/2013 | Bunch et al. |
| 9,586,029 | B2 | 3/2017 | Shekalim et al. |
| 10,391,274 | B2 | 8/2019 | Giles |
| 10,603,472 | B2 | 3/2020 | Gliner et al. |
| 2001/0037084 | A1 | 11/2001 | Nardeo |
| 2005/0020974 | A1 * | 1/2005 | Noriega ............ A61M 25/0138 604/95.04 |
| 2005/0027305 | A1 | 2/2005 | Shiu et al. |
| 2005/0049574 | A1 | 3/2005 | Petrick et al. |
| 2005/0119614 | A1 | 6/2005 | Melsky |
| 2006/0100640 | A1 | 5/2006 | Bolduc |
| 2006/0135961 | A1 | 6/2006 | Rosenman et al. |
| 2006/0241519 | A1 | 10/2006 | Hojeibane et al. |
| 2008/0027285 | A1 | 1/2008 | Yasunaga |
| 2010/0004633 | A1 | 1/2010 | Rothe et al. |
| 2010/0191150 | A1 | 7/2010 | Palme, Jr. et al. |
| 2011/0264074 | A1 | 10/2011 | Tegg et al. |
| 2013/0096541 | A1 | 4/2013 | Scheller et al. |
| 2014/0052109 | A1 | 2/2014 | Organ et al. |
| 2014/0180307 | A1 | 6/2014 | Shalev et al. |
| 2014/0276613 | A1 | 9/2014 | Goodman et al. |
| 2014/0276747 | A1 | 9/2014 | Abunassar et al. |
| 2014/0277310 | A1 | 9/2014 | Beetel et al. |
| 2014/0343538 | A1 | 11/2014 | Lenker et al. |
| 2015/0126992 | A1 | 5/2015 | Mogul |
| 2015/0230859 | A1 | 8/2015 | Mauch |
| 2015/0289770 | A1 | 10/2015 | Wang |
| 2016/0175564 | A1 | 6/2016 | Eberle |
| 2016/0206853 | A1 | 7/2016 | Bolduc et al. |
| 2016/0250449 | A1 | 9/2016 | Hansen |
| 2016/0279423 | A1 | 9/2016 | Kelly et al. |
| 2017/0043158 | A1 | 2/2017 | Kelly et al. |
| 2017/0291008 | A1 | 10/2017 | Hillukka et al. |
| 2019/0232050 | A1 | 8/2019 | Boers et al. |
| 2020/0222217 | A1 | 7/2020 | Trapeznikov |

FOREIGN PATENT DOCUMENTS

| | | |
|---|---|---|
| WO | 2009/112060 A1 | 9/2009 |
| WO | 2015/164912 A1 | 11/2015 |

OTHER PUBLICATIONS

Written Opinion Corresponding to PT.IB2020/053768 mailed Sep. 23, 2020.

* cited by examiner

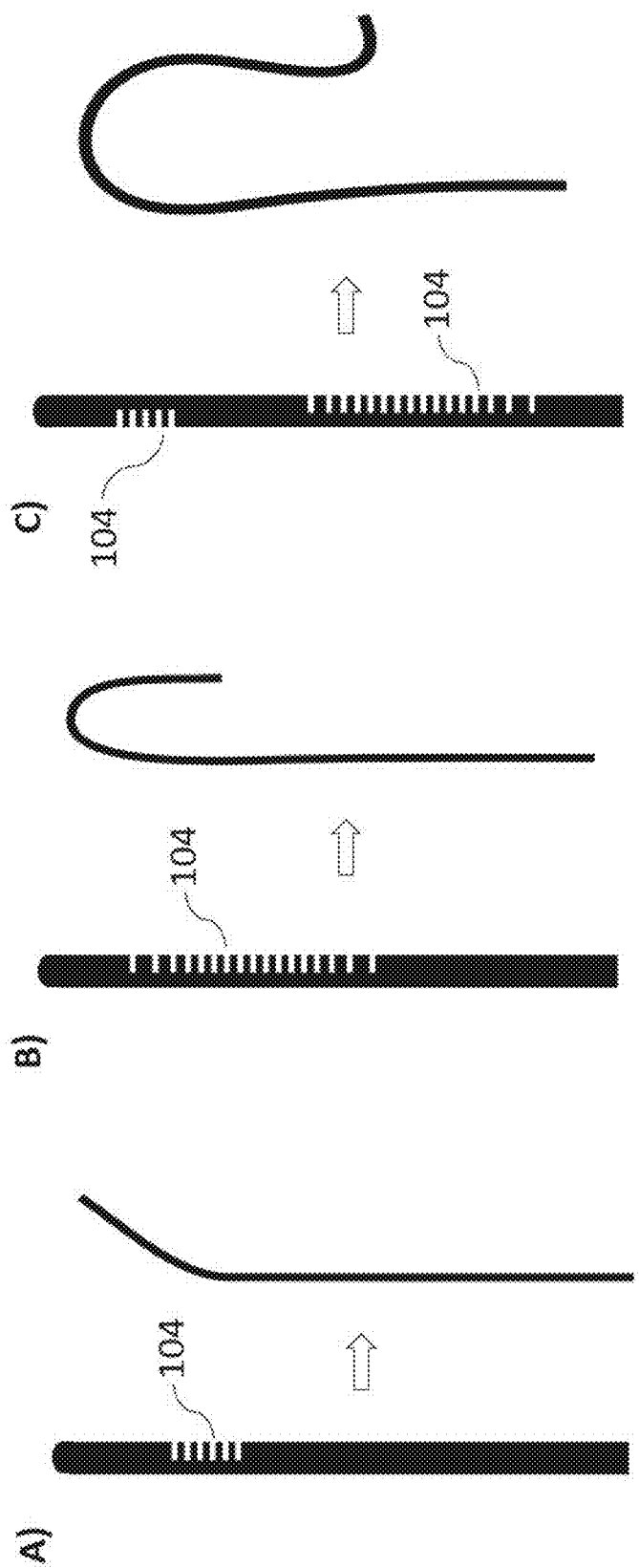

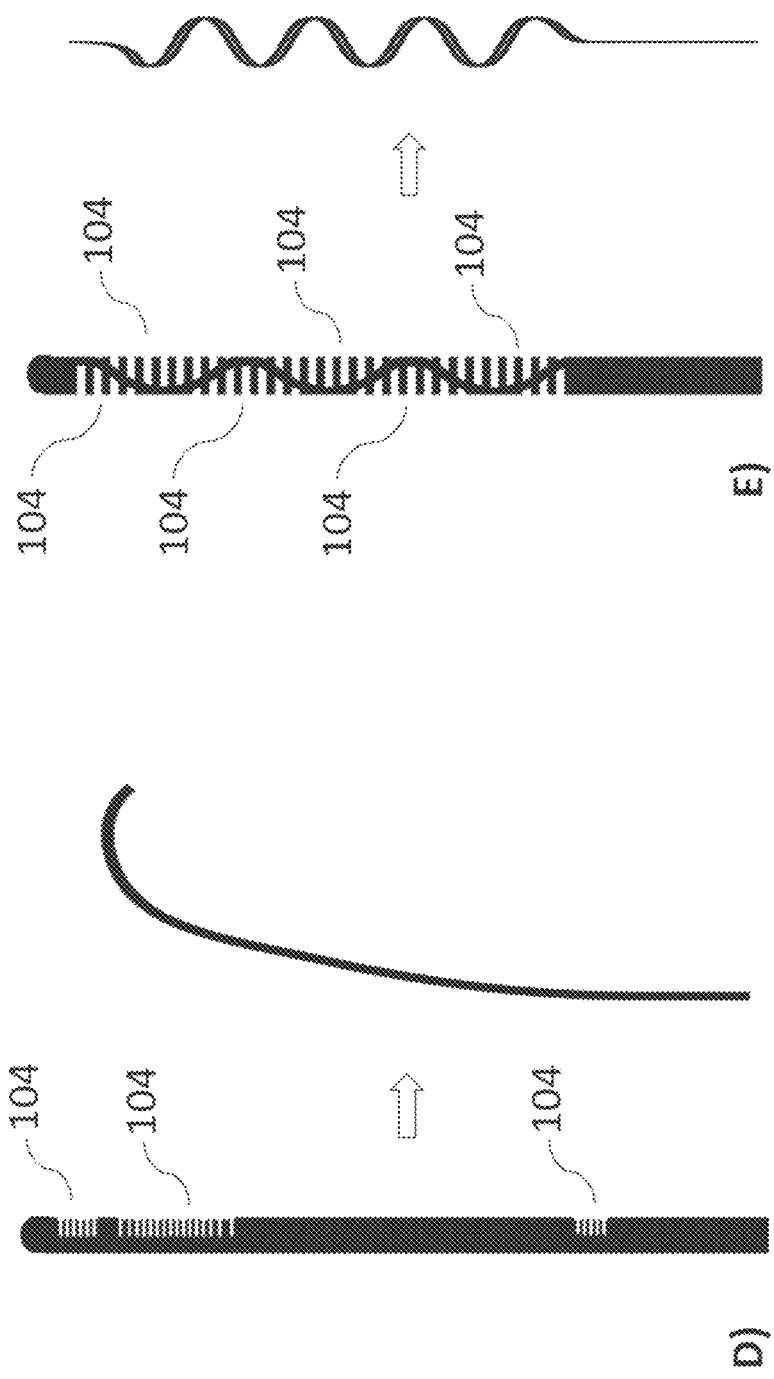

ENHANCED TORQUE STEERABLE GUIDEWIRE

TECHNICAL FIELD

The present invention belongs to the field of microtechnology and medical devices. In particular, the invention features a steerable guidewire and system for surgical operations.

BACKGROUND ART

Interventional radiology (IR) is a sub-specialty of radiology using minimally invasive image-guided procedures to diagnose and treat nearly all organs of the human body. The medical procedure mainly relies on both catheters allowing access through the vascular system (also includes the biliary tract, the gastrointestinal tract, etc.) and imaging methods (fluoroscopy, ultrasound, computed tomography) which allows precise navigation. IR is largely minimally invasive, as it takes advantage of the naturally present blood distribution system; for instance, vascular access is often provided through a single femoral artery/vein entry point, thus minimizing the risk to the patients and improving health outcomes. These procedures are most often less risky, produce less pain and decrease the recovery time in comparison to open surgeries.

Medical devices in IR are mainly composed of guidewires and catheters. At least the tip of these elements is radiopaque to enable image-guided navigation. The guidewires are introduced first in the vascular system and advanced in the blood vessels until reaching the targeted location. Catheters, which comprise a lumen, are advanced over guidewires which serve as a guiding element to reach the targeted location as well. Once the catheter is in place, it is used as a support channel for the introduction of other specific catheter devices aiming, for instance, at revascularization or embolization.

Guidewires have therefore the critical role of providing the initial access in order to reach a targeted region. Current guidewires can be either translated and/or rotated during this operation. They most often comprise a bent-shaped tip by which, through the external rotation and translation of the guidewire, the surgeon can select vascular intersections. Combined with imaging methods, this allows the surgeon to navigate the guidewire to the intended region.

The shape of the guidewire distal tip therefore largely impacts the navigation success of the device through the vascular system. Currently, guidewires are proposed with different pre-bended shapes, the surgeon selecting the best suited option according to the vessels geometry and the region he wants to reach. During the procedure, (s)he commonly needs to replace the guidewire by another, more appropriate one. Similarly, the guidewire is often extracted from the patient, bended by hand by the surgeon (some guidewires propose this feature), before being re-introduced in the patient. This results in increased surgery time and procedure-related risks such as infections.

Guidewires replacement and distal tip repeated bending (by hand) is particularly frequent when the surgeon is confronted to tortuous blood vessels. This includes (and is not limited to) the neurovascular system, the cardiovascular system and the peripheral vascular system. In general, the blood vessels are more prone to present irregular, tortuous shapes at the distal portions of the vascular system (e.g. second and third level of the brain arteries).

Several solutions have been proposed in the past for solving the above shortcomings, in particular by providing steerable surgical tools to facilitate the surgeons' operation. For instance, US Patent Application 2016/0250449 describes a neuro-surgery assembly including a neuro-catheter slidably received over a wire guide. The wire guide includes an inner tube positioned within an elongated hollow tube that includes a pattern of openings at its distal segment to provide an atraumatic tip for reaching sensitive locations in the brain. The wire guide is changeable between a stiff condition in which the inner tube is pressurized and a soft condition in which the inner tube is depressurized. The user may switch between the stiff and soft conditions to negotiate the tortuous pathway to a brain treatment site without a need to swap out to a different wire guide to support advancement of the neuro-catheter.

WO 2015/164912 discloses an elongate, steerable apparatus such as a guidewire including an elongated body having at least one inner lumen, one, or more preferably multiple, tendons coupled to a distal bending region (e.g., the distal tip region) at a distal end and coupled to a proximal axial translation region at a proximal end. The proximal end may be configured to have multiple, in-line axial translation regions that each couple to a pull-wire or tendon so that axially moving the axial translation region relative to other regions of the device (e.g., pushing or pulling it longitudinally in the direction that the apparatus extends) may result in moving the pull-wire or tendon and bending the bendable distal region. The in-line axial translation regions may be connected to each other, e.g., elastically connected to each other via a spring or stretchable/compressible material.

In US 2014/0052109 it is described a steerable catheter probe having a body portion adapted for being connected to a proximal hub and a distal end portion connected to the body portion, wherein the catheter body defines a lumen; the distal end portion having a compressible segment and a non-compressible segment, the compressible segment having a longitudinal centerline; and a pull member attached to the distal end portion and adapted for applying a proximally directed force to the distal end portion whereby at least a portion of said compressible segment is compressed. Steering is provided by the positioning of the pull member and the design of the compressible segment: this comprises several compression coils, and at least one of its members of smaller diameter than the other larger and equal diameter coils. Pull wire is attached at fixation point to one of the large diameter coils distal to the small diameter coil, and within the lumen of large diameter coils but outside the lumen of any smaller diameter coils. Further examples of prior art steerable devices/guidewires are described for instance in U.S. Pat. No. 5,203,772, US 2014/0343538, US 2006/0241519, US 2001/0037084, US 2008/0027285 and US 2016/0206853.

All the above-cited prior art solutions present several shortcomings. For instance, many of the known steerable guidewires/catheters are bulky, with a complicated actuation system and resulting in complex manufacturing, which raises production costs and limit the miniaturization of the final product, that in some instances is critical for e.g. navigating in tortuous, tiny blood vessels as found in the brain vascular network. Additionally, many of the known devices can deflect in several directions, a feature that enhance even more the fabrication complexity and the operation of the device itself, mainly due to sophisticated actuation means. In this context, it should be mentioned that medical practitioners intended to use guidewires or catheters are generally quite reticent to drift from common clinical practice; the use of such complex tools would require a certain training for mastering their use, and this could hinder or at least limit the adoption of the technology. Furthermore, actuators are always located at the very proximal end of the guidewire; up to the inventors' knowledge, no existing systems provide a clutchable manipulator which can be fixed by the surgeon at any desired portion of a guidewire's body while still providing actuation means to the deflectable tip.

A further, non-negligible drawback of the solutions known in the art relates to the functional combination of the steering functionality in a guidewire with a sufficient pushability and torquability (transmission of a torque or rotational stiffness) upon operation of the guidewire. Typically, some designs have been proposed in the past for guidewires to enhance the transmission of the torque and the capability to push a guidewire along blood vessels, such as for instance in the U.S. Pat. Nos. 6,682,493 and 7,878,984, without however implementing any solutions to actively steer a guidewire to choose a path within a body cavity.

There is therefore still need for simple and user-friendly steerable guidewires which can be reliably miniaturized to commonly used dimension in IR while providing enhanced control, pushability and torque transmission for navigating in tortuous blood vessel networks.

SUMMARY OF INVENTION

In view of what previously discussed, the present inventors developed a device, system and methods for using thereof that address and overcome the drawbacks of the prior art solutions as summarized above.

In particular, the invention relates to a steerable guidewire for surgical procedures and an associated system further comprising an actuator with advanced features to allow a user to control the insertion and guiding of the device.

A first aim of the invention was to manufacture a steerable guidewire through a simple, reliable and cheap manufacturing process.

A second aim of the invention was to create a guidewire having steering properties which is easy to operate and manipulate so to access complex and tortuous vascular networks.

A further aim of the invention was to create a system comprising a steerable guidewire which can be used by an operator (such as a surgeon) by minimally drifting from the common clinical practice.

Still a further purpose of the invention was to develop a steerable guidewire having optimized performances in terms of pushability and torque transmission without compromising the steering performances.

All these aims have been accomplished by the present invention as defined hereinafter and in the appended claims.

The invention relates to a guidewire comprising a tubular structure and a core wire fixed both at the proximal and the distal end of the tubular structure. The tubular structure is designed to transmit torque from its proximal end to its distal end with high fidelity. The tubular structure, when combined with the core wire (fixed at both ends), forms a device designed to actively change the distal tip shape in a controlled manner, while imparting a mechanical constraint to another part of said device. Typically, the system can change the profile of its distal end (bend, helix, hook, etc.) when the proximal region is elongated.

This was made possible by a careful study of the local mechanical properties of the tubular element. In particular, it is herein disclosed a way to drastically and elastically extend a tube without reaching permanent deformation. At the same time, the device herein disclosed presents different tubular designs which, when subjected to mechanical compression, spatially reconfigure from a straight "parent" shape at rest to various shapes.

Accordingly, in one aspect the invention relates to a steerable guidewire for insertion into a body cavity, said guidewire comprising:
a) an elongated body defining a longitudinally-arranged lumen comprising
  i) a proximal end portion and
  ii) a distal end portion comprising a spatially reconfigurable portion and a tip;
b) a pull wire located along said lumen and affixed to said distal end portion and to said proximal end;
c) an actuation region located on said proximal end portion adapted to impart a tension force on the pull wire resulting in a distally-directed compression force on the spatially reconfigurable region; and
an intermediate region tubular element on said body located between said spatially reconfigurable portion and said proximal end.

Another aspect of the invention relates to a system comprising the steerable guidewire as described herein and an actuator adapted to impart a tension force on the pull wire resulting in a distally-directed compression force to the spatially reconfigurable region.

Further embodiments of the present invention are defined by the appended claims.

The above and other objects, features and advantages of the herein presented subject-matter will become more apparent from a study of the following description with reference to the attached figures showing some preferred aspects of said subject-matter. However, the present invention is not limited to the embodiments as described in the following and/or depicted in the drawings; to the contrary, the scope of the present invention is defined by the appended claims.

BRIEF DESCRIPTION OF DRAWINGS

In the Figures:

FIG. 4 shows five different embodiments of the device of the invention, detailing in particular the distal end of the guidewire and the reconfigurable regions thereof: A) angled shape, B) J-shape, C) Simon shape, D) Cobra shape, E) anchor shape;

DETAILED DESCRIPTION OF THE INVENTION

Figure 1:
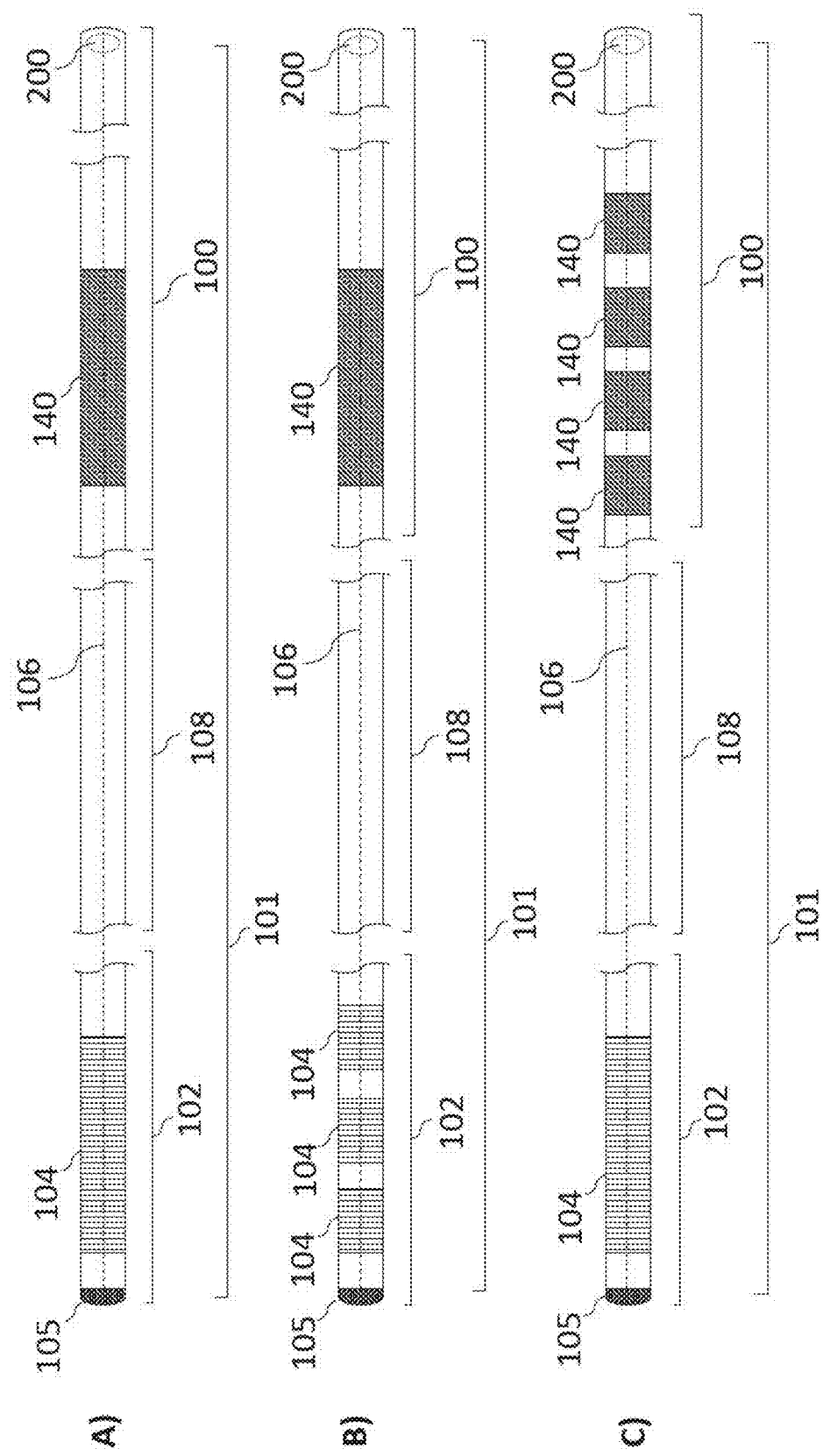
FIG. 1 depicts three schematic sketches of three embodiments of the device of the invention: A) steerable guidewire having one reconfigurable region and one actuation region; B) steerable guidewire having three reconfigurable regions and one actuation region; C) steerable guidewire having one reconfigurable region and four actuation regions.

The subject-matter herein described will be clarified in the following by means of the following description of those aspects which are depicted in the drawings. It is however to be understood that the subject matter described in this specification is not limited to the aspects described in the following and depicted in the drawings; to the contrary, the scope of the subject-matter herein described is defined by the claims. Moreover, it is to be understood that the specific conditions or parameters described and/or shown in the following are not limiting of the subject-matter herein described, and that the terminology used herein is for the purpose of describing particular aspects by way of example only and is not intended to be limiting.

Unless defined otherwise, technical and scientific terms used herein have the same meaning as commonly understood by one of ordinary skill in the art to which this invention belongs. Further, unless otherwise required by the context, singular terms shall include pluralities and plural terms shall include the singular. The methods and techniques of the present disclosure are generally performed according to conventional methods well known in the art and as described in various general and more specific references that are cited and discussed throughout the present specification unless otherwise indicated. Further, for the sake of clarity, the use of the term "about" is herein intended to encompass a variation of +/−10% of a given value.

The following description will be better understood by means of the following definitions.

As used in the following and in the appended claims, the singular forms "a", "an" and "the" include plural referents unless the context clearly dictates otherwise. Also, the use of "or" means "and/or" unless stated otherwise. Similarly, "comprise", "comprises", "comprising", "include", "includes" and "including" are interchangeable and not intended to be limiting. It is to be further understood that where for the description of various embodiments use is made of the term "comprising", those skilled in the art will understand that in some specific instances, an embodiment can be alternatively described using language "consisting essentially of" or "consisting of."

In the frame of the present disclosure, the expression "operatively connected" and similar reflects a functional relationship between the several components of a device or a system among them, that is, the term means that the components are correlated in a way to perform a designated function. The "designated function" can change depending on the different components involved in the connection; for instance, the designated function of an actuator operatively connected with an actuation region on the guidewire is that of operating the actuation region in such a way that a deflection is obtained at the distal end of the guidewire. A person skilled in the art would easily understand and figure out what are the designated functions of each and every component of the device or the system of the invention, as well as their correlations, on the basis of the present disclosure.

As used herein, the terms "torque" is a twisting, tangent or turning force that tends to cause rotation around an axis, and particularly the longitudinal axis of the guidewire. Further, the term "torquability" is used herein to mean the ability of a guidewire that is rotating to overcome turning or torque resistance. It is generally measured in pounds per foot or newtons per meter.

The term "steerability" generally refers to the ability to controllably direct the distal tip of a guidewire to point its tip in the desired direction during an advancement procedure. Steerability is an important performance characteristic for a steerable guidewire; the ability to controllably orient the tip allows the guidewire to be navigated into e.g. different branches of vessels and/or across a stenosis. However, in the frame of the present disclosure, "steerability" refers to the capability to actively control the tip of the guidewire of the invention by acting on an actuation portion thereof to reconfigure a spatially reconfigurable portion. Accordingly, the term "steerable" when referred to the guidewire of the invention is to be intended as "actively steerable" or "dynamically steerable", i.e. the guidewire of the invention can be actively deflected by a user operating it by mechanically acting on an actuation portion depending on the needs and circumstances.

The expression "1:1 torque response" is used herein to refer to the ability of the distal tip to rotate exactly in step with rotation of the proximal end of a guidewire. For example, if the proximal end of the guidewire is rotated through 90 degrees, the tip will ideally rotate through 90 degrees—hence a 1:1 response—in a very short period of time (less than 0.5 s). It shall be noted that a torque, and therefore a torque response, of the guidewire of the invention is not linked to the steerability of the same, the former being the ability of the guidewire to rotate about its longitudinal axis, whereas the latter is the ability of the guidewire to deflect its tip off axis and reconfigure the distal end.

The present invention stems for a previous work described in the patent application PCT/IB2017/056592 owned by the present Applicant and incorporated herein in its entirety by reference. The invention is directed to a steerable guidewire capable of being actively/dynamically bent, deflected or otherwise controlled off-axis in order to move towards a certain target location along a path within a vessel, body cavity or hollow organ(s).

With reference to FIG. 1A, depicting a schematic sketch of one embodiment of the invention, a steerable guidewire for insertion into a body cavity is shown, said guidewire comprising:
a) an elongated body 101 defining a longitudinally-arranged lumen 200 comprising
  i) a proximal end portion 100 and
  ii) a distal end portion 102 comprising a spatially reconfigurable portion 104 and a tip 105;
b) a pull wire 106 located along said lumen 200 and affixed to said distal end portion 102 and to said proximal end 100;
c) an actuation region 140 located on said proximal end portion 100 adapted to impart a tension force on the pull wire 106 resulting in a compression force to the spatially reconfigurable region 104; and
d) an intermediate tubular element 108 on said body 101 located between said spatially reconfigurable portion 104 and said proximal end 100.

The steerable guidewire of the invention comprises a proximal end 100, an elongated body 101 and a distal end portion 102. A lumen 200 spans from the distal end 102 up to the proximal end 100 and along the entire body 101, said lumen 200 being coaxially arranged compared to the longitudinal axis of the device. The distal end portion 102 comprises a bendable portion 104 and a tip 105 at its very end. Tip 105 is generally an atraumatic and non-sharp tip, with a rounded, oval, or similar appearance. Materials opaque to X-rays, such as platinum, gold, tungsten, tantalum or the like, may be advantageously incorporated therein, to act as a fluoroscopic marker to aid in visualization. The spatially reconfigurable portion 104 is a region at the distal end 102 of the device that is significantly more flexible and susceptible to deflection than the remaining body 101 and/or proximal region 100.

A pull wire 106 is affixed on at least two anchor points along the device, a first anchor point being close or on the distal end of the bendable portion 104 and a second anchor point being close or on the proximal end 100. The pull wire 106 can include any suitable structure for use as a core wire, as will be understood by those of skill in the art. It can have a solid cross section, but in some embodiments, can have a hollow cross-section. In yet other embodiments, the pull wire 106 can include a combination of areas having solid cross-sections and hollow cross sections.

The pull wire 106 extends from said first, distal anchor point up to said second, proximal anchor point along said lumen 200. In one embodiment, for instance, said pull wire 106 is affixed on the distal end of the bendable portion 104, which might be on the tip 105 of the guidewire, and on the terminal portion of said proximal end 100. In the depicted embodiment, the spatially reconfigurable portion 104 is located at the very distal end of the device, and the pull wire 106 is connected to the tip 105; alternative embodiments are shown on FIG. 1B and FIGS. 4A-4E. The guidewire comprises, in the spatially reconfigurable portion 104, a reinforcement structure 107 advantageously located on one lateral side and a flexible, stress relief portion 120, located on the opposed lateral side.

The active steerability, deflection or spatial reshape of a distal region 102 of the guidewire device, in particular of the spatially reconfigurable portion 104 thereof, is obtained by imparting an indirect, longitudinal tension force on the pull wire 106. Particularly, this is accomplished by operating an actuation region 140 located on the proximal end portion 100, the pull wire 106 being further affixed to said proximal end portion 100, said actuation region 140 being adapted to impart a tension force on the pull wire 106 resulting in a distally-directed compression force to the spatially reconfigurable region 104, as will be detailed later on. The inner pull wire 106, which is longitudinally arranged with respect to the device's body inside the lumen 200 thereof, is not compressible nor extensible longitudinally, while being flexible.

The steerable device is fabricated so that it is substantially straight from its proximal end 100 to its distal end 102. As will be explained later on in more details, the manipulation of a control mechanism 140 at the proximal end 100 causes the distal, spatially reconfigurable region 104 of the steerable device to be actively bent or curved away from its longitudinal axis. However, in some embodiments a pre-bending of the distal end 102 might be present.

In terms of materials, one or more of the portions composing the guidewire of the invention (the entire body 101 or at least one of the distal end 102, the intermediate tubular member 108 and the proximal end 100, as well as any combinations thereof) can be substantially made of elastic and/or super-elastic polymers, super-elastic metals or various metals/alloys/oxides such as for instance various elastomers, silicon polymeric materials like Polydimethylsiloxane (PDMS), silicon adhesives, silicone rubbers, natural rubbers, thermoplastic elastomers, polyamide, polyimide, poly ethylene (PE), poly propylene (PP), polyether etherketone (PEEK), Acrylonitrile butadiene styrene (ABS), epoxys, polytetrafluoroethylene (PTFE), polyurethane, thermoplastic polyurethanes (TPU), Nylon, Polyether block amide (PeBax), Kevlar, stainless titanium, steel or stainless steel, nickel titanium alloy (Nitinol), nickel-chromium alloy, nickel-chromium-iron alloy, cobalt alloy, tungsten, cobalt, chrome, nickel, aluminum, copper, molybdenum or any combination thereof.

Figure 2:
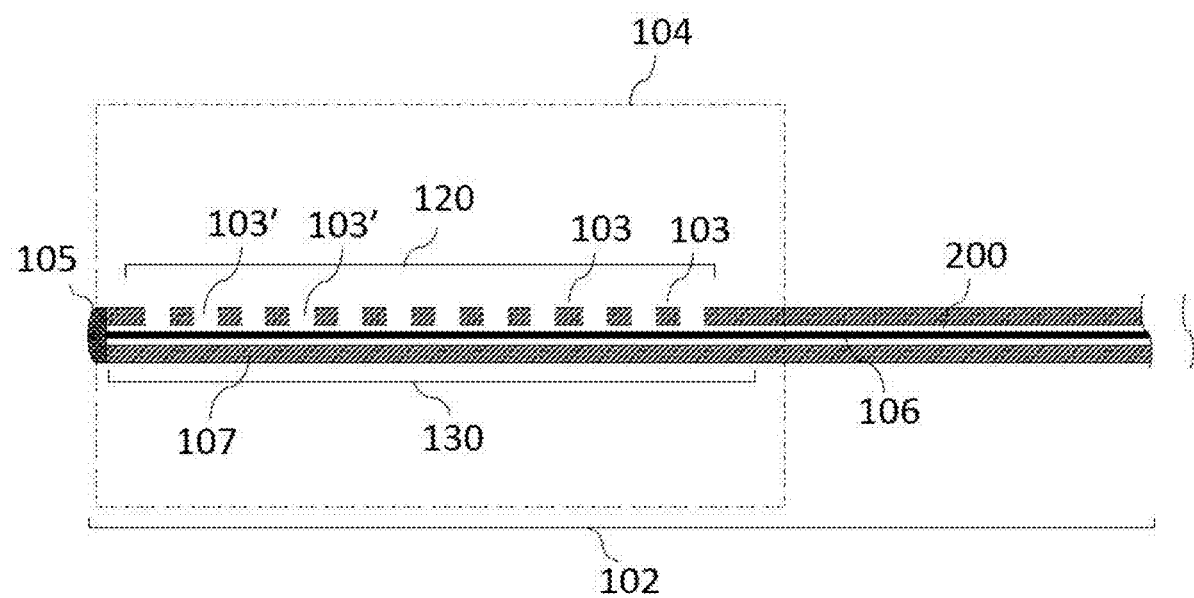
FIG. 2 shows a longitudinal cross section of one embodiment of a reconfigurable region of the device of the invention.
Figure 9:
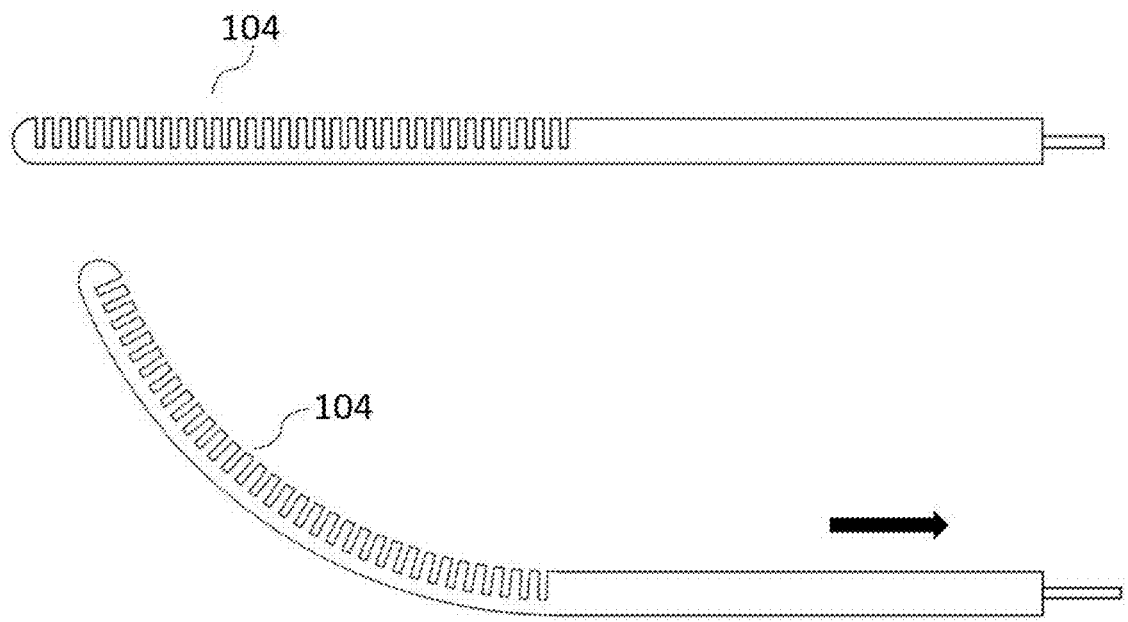
FIG. 9 depicts two lateral views of the device in a rest and actuated positions; notice the compression of the stress relief elements on the inner side of the bend.
Figure 10:
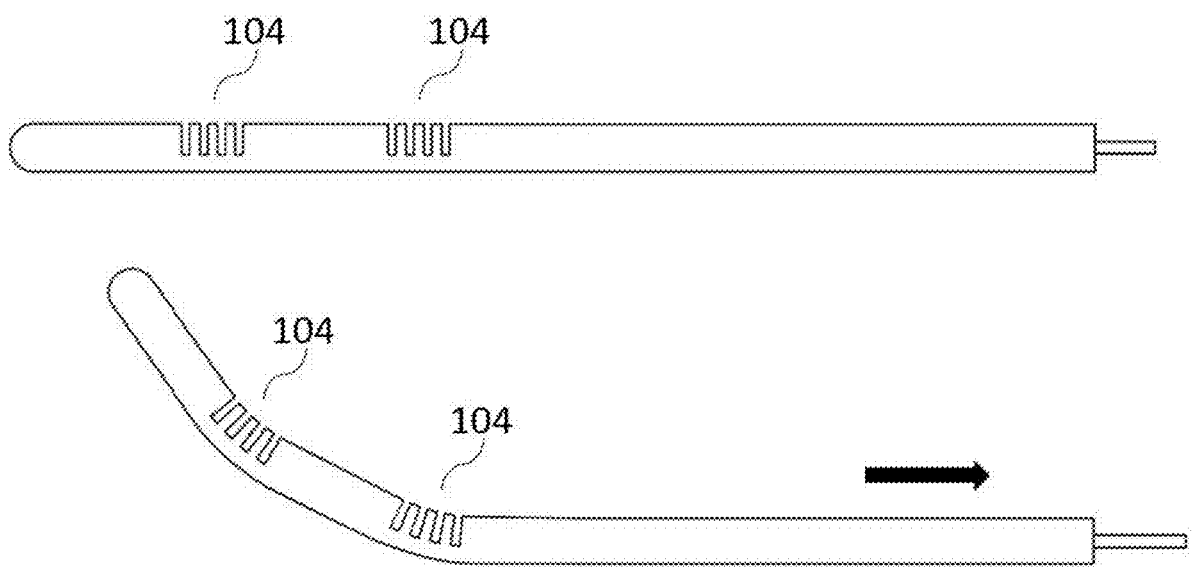
FIG. 10 shows an alternative embodiment of the device of the invention comprising two close reconfigurable regions: A) lateral view of the device in a rest position; B) lateral view of the device in an actuated position, showing elbow bends.

The spatially reconfigurable region 104 is characterized by the presence of two distinct portions, each positioned on one side of said region 104, and one opposed to the other, that are named herein for the sake of clarity and simplicity stress relief portion 120 and constrained portion 130 (FIG. 2). Those two portions are designed to induce an asymmetric resistance to compression in the spatially reconfigurable region 104 that guides the direction of bending when a longitudinal compression force (stress) is indirectly applied thereon by the pull wire 106. To do so, the stress relief portion 120 comprises a series of stress relief elements 103 separated by hollow spaces 103' that allows for the compressibility of the spatially reconfigurable region 104; to the contrary, the constrained portion 130 is characterized by the presence of a so-called reinforcement structure 107 that limits the compressibility of one side of said region 104 so that the generation of a compression stress will induce a deflection which is opposed to the side of the reinforcement structure 107, as schematically depicted in FIGS. 9 and 10.

In the most preferred set of embodiments, the device is composed, at least at its distal end 102 and particularly at the spatially reconfigurable region 104, of a tubular solid body, containing a longitudinally-arranged thru hole defining the lumen 200 into which a pull wire 106 is located. The pull wire 106 is attached by any suitable attachment techniques such as for instance welding, soldering, brazing, adhesive and the like on e.g. the distal end tip 105 of the solid body. The spatially reconfigurable region 104 of the solid tubular body, which can have any lateral cross-section (perpendicular to the longitudinal axis) such as round, elliptic, square, rectangular and the like, comprises a plurality of stress relief elements 103 in its stress relief portion 120 embodied as cutouts (FIG. 2). In embodiments where the elongated body 101 of the device is also made of the same material of said solid body, such as a polymeric material or a metal as previously listed, the reinforcement structure 107 constitutes an integral part of said body 101. Briefly, a tubular element can be shaped to include a plurality of cutouts on one side of one of its extremities while leaving the other side unaltered, so to define a built-in blocked lateral side 130 and a lateral bendable side 120. Accordingly, in one embodiment the steerable guidewire of the invention is characterized by having said elongated body 101 configured as a monolithic, or single part, element. This configuration is advantageous for what concerns the possibility of rationally engineering the flexibility of the guidewire through manufacturing method(s) adapted to be applied on a single tubular element, which in turn might facilitate the rational enhancement of the pushability and torque transmission thereof.

With regards to the manufacturing methods, for instance, non-conventional ones are typically used for the device of the invention, due to the particularly small dimensions, materials (metals, polymers) and thicknesses presented. The raw material forming the tubular structure to be machined is formed of material directly extruded to the right dimensions (outer, inner diameters and length). Another method is adapting the outer diameter of the tubing by precision machining methods such as EDM (Electro Discharge Machining), mechanical abrasion or laser light abrasion. Another method of forming the raw tubular structure is rolling about 360° a polymer or metal thin film/sheet and bring the two edges together by laser welding said edges. The machining of complex structures are obtainable by the use of high precision methods such as laser light with pulsing frequencies of milli-, nano-, pico- or femtoseconds. The laser heads are typically mounted on a X-Y-Z axis and the tubing is fed through a rotary and linear feeding mechanism. Additionally or alternatively, methods such as mechanical abrasion using radial abrasive blades, Computer Numerical Control (CNC) mechanical machining and/or electro-chemical/chemical etching can be employed.

Figure 3:
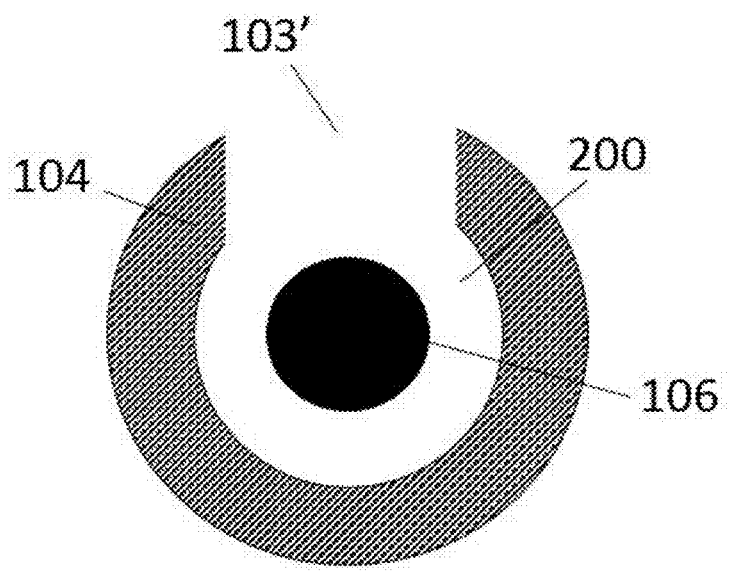
FIG. 3 shows a transversal cross section of the same embodiment of FIG. 2.

In one embodiment as exemplarily represented in FIGS. 2 and 3, the distal end 102 of a tubular element is rendered single-sided deflectable by cutting slots or gaps 103', hereinafter also called "motifs", passing completely through the entire thickness of the tubular element so that a sort of spine with ribs is formed. The distal end 102 of the device of the invention fulfills the following requirements: imitates the most common guidewire tip configurations as typically used as of today in interventional radiology surgeries; maintain an optimal torquability despite its floppy nature; and is sufficiently flexible and atraumatic to avoid artery puncture during navigation.

In a set of embodiments, the reinforcement structure 107 can have various different shapes, and even more than one reinforcement structures 107 can be present along the spatially reconfigurable portion 104. Moreover, in some embodiments the reinforcement structure 107 can span from the distal tip 105 all along the spatially reconfigurable portion 104, so that a constrained portion 130 would cover one entire side thereof, or the reinforcement structure 107 can define a more limited portion of spatially reconfigurable region 104 as a constrained portion 130. Put it differently, one single spatially reconfigurable region 104 might be present on the distal end 102 of the device when a single reinforcement structure 107 is present, or a plurality of spatially reconfigurable regions 104 might be present when more than one reinforcement structure 107 is present, as depicted for instance in FIGS. 9 and 10. When the device is embodied as a monolithic element, or at least its distal end, the reinforcement structure(s) 107 result(s) from the cut-outs defined within the spatially reconfigurable portion 104, and referring to a plurality of spatially reconfigurable regions 104 might be more sensitive for the sake of clarity.

For instance, more than one reinforcement structure 107, or a sectioned one, can be implemented on the spatially reconfigurable region 104 in order to set a plurality of constrained portions 130. This embodiment is particularly useful for obtaining "elbow" deflections of the spatially reconfigurable region 104, wherein by "elbow" deflection it is meant that the deflection in the reconfigurable region 104 does not occur in a uniform way along the said region 104 but at a relatively discrete position(s) displaced proximally from the tip 105 of the guidewire (FIG. 10). This arrangement could enable or facilitate negotiation of the artery with e.g. minimal trauma to the vascular intima.

Each spatially reconfigurable region 104 comprises a plurality of stress relief elements 103 separated by slots or gaps 103', so to form a stress relief portion 120 configured as sets of "ribs". In preferred aspects, each portion 104 is embodied as a solid tubular member comprising radially aligned slots 103' separated by ribs 103. Particularly, the spacing and disposition of the slots 103' offer the possibility to establish a plurality of designs, and therefore of functions in terms of steerability. In some embodiments, slots 103' may be substantially equally spaced along a spatially reconfigurable region 104. However, in some embodiments, slots 103' may be spaced unequally along a spatially reconfigurable region 104, may be of unequal sizes, or both.

The reinforcement structure 107 may have e.g. a rectangular, triangular, rhomboidal or any other suitable contour appearance depending on the needs and circumstances; the contour shape would define the resistance to the bending of the constrained portion 130 upon application of a tensile stress, which will be higher in those portions of the constrained region 130 having larger width of the reinforcement structure 107 and vice versa, assuming an homogeneous thickness of the reinforcement structure.

In view of the above, it will be apparent that the distal end 102 can present different tubular designs which, when subjected to mechanical compression, spatially reconfigure from a straight parent shape to various shapes. These different shapes allow the guidewire to help a surgeon access complex anatomic configurations that would normally be close to impossible to access with a classical, non-actively steerable guidewire. Other configurations result in new, unexplored functions to the guidewire, such as, for example, gently anchoring the guidewire into a specific location in a small artery. For instance, as exemplarily shown in FIG. 4, the guidewire of the invention allows, based on the rational design of its distal end 102 (which will be detailed later on), to obtain some of the most common tip configurations used in interventional neuroradiology, such as for instance so called an angled shape, J-shape, Simon shape or Cobra shape (FIGS. 4A to 4D, respectively).

Commercially available devices are delivered out of the package with their tips pre-shaped with these common configurations, as they help the surgeons navigate specific difficult cases. Alternatively, the devices are delivered straight and allow a tip shape remodeling performed by hand by the surgeon. Advantageously, the steerable guidewire of the invention can actively and on-demand change its geometrical configuration when subjected to an actuation.

In one embodiment, the guidewire can have its distal end 102, and particularly its bending portion 104, designed to obtain an "anchor shape" (FIG. 4E) upon actuation. The anchor shape allows the flexible distal end 102 of the guidewire to be curled-up in a helicoidal shape against the inner wall of an artery. To do so, an elongated reinforcement structure 107 is located in a helicoidal fashion on the distal end 102 to define a constrained region 130, and therefore a stress relief region 120, winding about the spatially reconfigurable region 104 (and defining it). The flexibility of the tip region allows the curled shape to accommodate nearly any artery tortuosity and curve. The main application of this "anchor" is to give the ability to the surgeon to fix the guidewire's tip at a specific location and create a so-called "fixed point" which will facilitate the insertion of catheter devices on top of the established guiding wire and avoid unwanted movement (slipping) of the guidewire.

Figure 22:
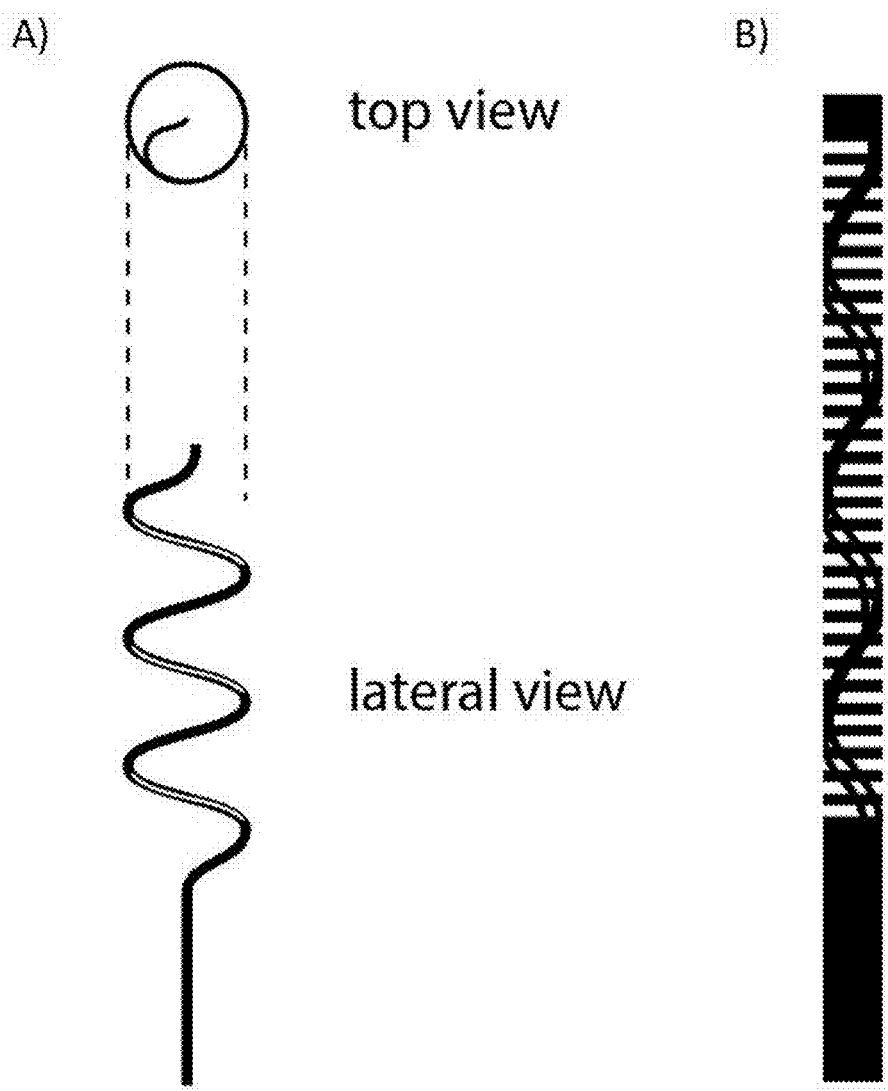
FIG. 22 depicts a lateral and a top view (A), as well as a lateral cross-section (B) of a reconfigurable portion of the device of the invention having a cylindrical spiral, three-dimensional configuration.

The high versatility of the inventive concept proposed by the present invention permits to envisage various configurations, as already outlined above, but also diverse, unprecedented applications for a guidewire. In particular, the spatially reconfigurable region 104 can be configured and adapted to further create, in addition to the above-described two-dimensional configurations, three-dimensional shapes in a very easy and intuitive way. As depicted for instance in FIG. 22, and as a way of non-limiting example, a helicoid shape can have a varying projected diameter, therefore becoming, on at least a portion thereof, a conical helix or spiral, or can have a fixed projected diameter that gives rise to a cylindrical helix. Shapes like conical or cylindrical spirals, positioned at the distal portion of the device, can be exploited for new applications going beyond the typical guiding functioning of guidewires: in fact, 3D arranged tips may be advantageously used for anchoring to, and/or removing, blood or other aggregates that may be formed e.g. in the vasculature, including blood clots or foreign body impairing blood circulation. Additionally or alternatively, a so-configured guidewire according to the invention may theoretically be used for removing other bodies located into tubular bodily structures, such as kidney stones.

Concerning the spatially reconfigurable region 104, this is typically smaller or equal in length than the reinforcement structure 107 length, such as about from 5% to 105% of reinforcement structure 107 length. A typical range for the width of reinforcement structure w is 5% to 95% of the portion 104 diameter, D.

The proximal region 100 of the guidewire is designed and intended to enable the handling of the device by the surgeon's hands. Because of these requirements, the proximal end 100 is configured and optimized so to represent a tool for the surgeon to be able to navigate the device towards a target spot into a body cavity during a surgery (push-pull, rotation). Particularly, the design and the materials of the proximal end 100 are tailored in order to provide a 1:1 torque response and excellent pushability; at the same time, the proximal end 100 comprises an actuation region 140 where a manipulator/actuator can be clutched or otherwise connected and used in order to allow the surgeon to induce the deflection at the distal end 102, which is one of the key features of the device of the invention. Additionally, the proximal end 100 may comprise an end portion adapted for connecting to a longitudinal guidewire extension.

As anticipated, the steerable guidewire comprises an actuation region 140 at its proximal end 100 which is adapted to impart an indirect tension force on the pull wire 106 bringing to a compression force on the spatially reconfigurable region 104 resulting in a reshape thereof, in order to control the articulation at the distal end 102, particularly at the region 104. The actuation region 140 is designed to permit a functional access to the pull wire 106 and manipulation thereof; for instance, the actuation region 140 can be placed at the very proximal end extremity of the device where it can be directly clamped, grasped or otherwise manipulated to impart distal longitudinal forces.

Figure 11:
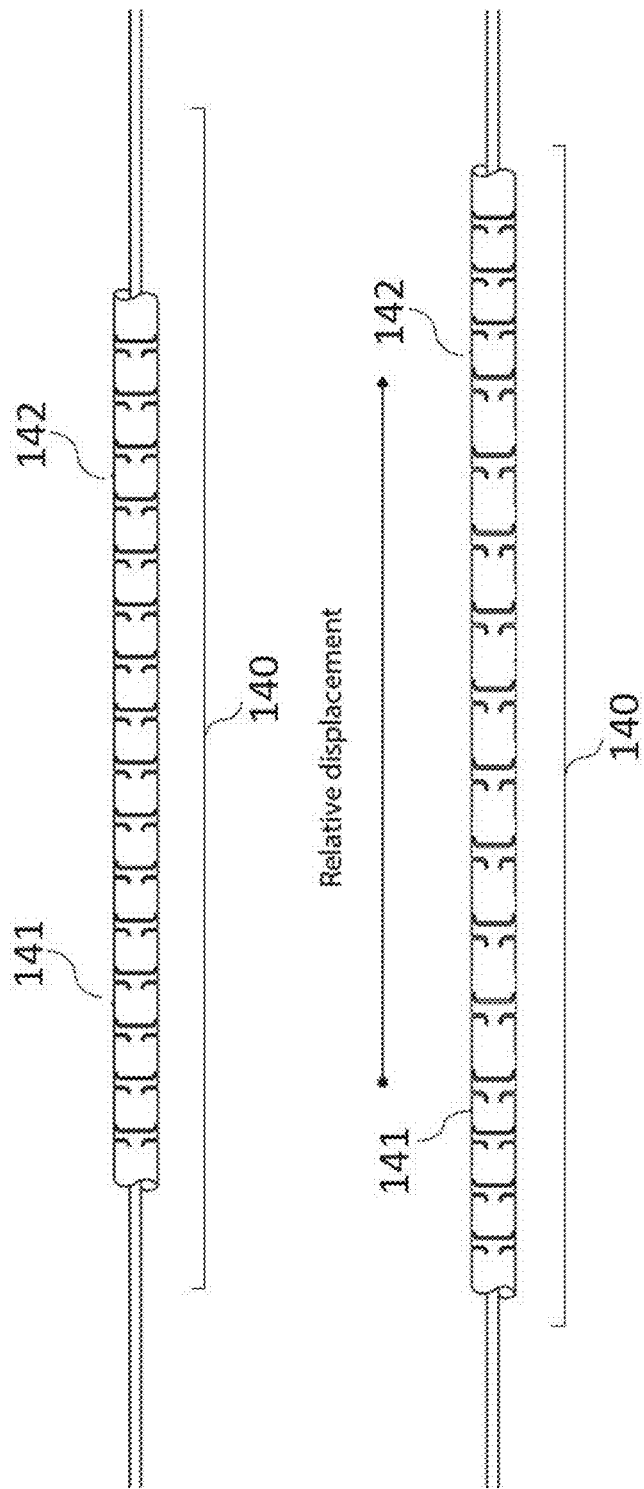
FIG. 11 shows two longitudinal cross sectional views of the actuation portion in a rest and actuated positions.
Figure 12:
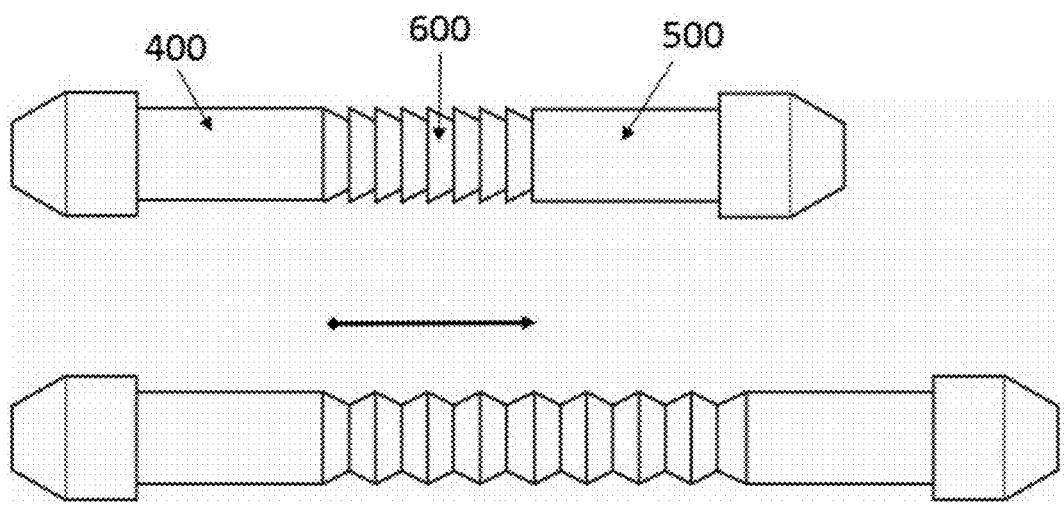
FIG. 12 shows one embodiment of the actuator, having two handles connected via an accordion-like element.
Figure 13:
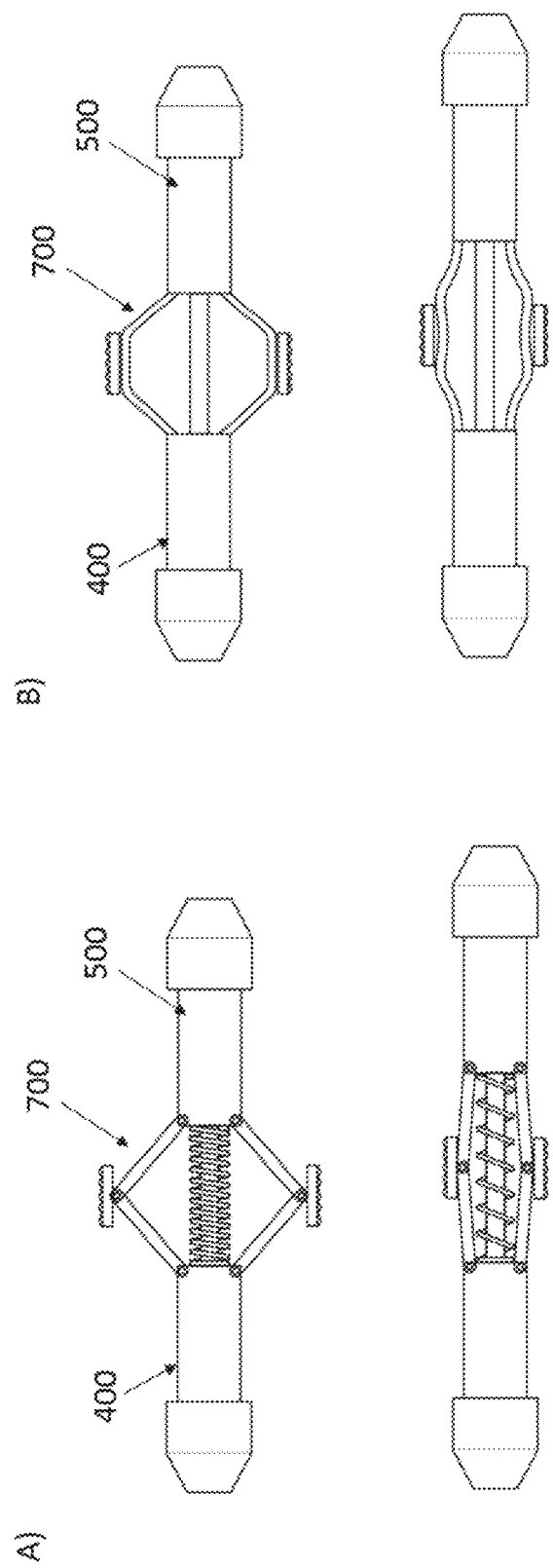
FIG. 13 shows two embodiments of the actuator, having two handles connected via A) a spring and a displacement element or B) a spring tab or clip.

The steering mechanism of action consists of a collapse of the bendable region 104 by means of longitudinal stress forces applied on the actuation region 140. In particular, upon operation, the actuation region 140 may be maintained e.g. by clamping, on two opposed, longitudinally-placed anchor points 141 and 142 (see FIG. 11). The relative displacement of the blocking point 141 and 142 imparts an axially, longitudinally directed force on the entire body 101 up to the distal end 102, which tends to collapse the hollow spaces 103' in the stress relief portion 120 of the spatially reconfigurable region 104, finally bringing the stress relief elements 103 closer together.

The actuation region 140, because of its inherent function, is elastic in nature; in particular, the actuation region 140 is conceived to be elongated (deformed axially) without irreversibly deform, so to be actuated several times depending on the needs and circumstances without lost in performance. At the same time, the actuation region 140 is also designed in such a way as to reduce as much as possible its compression factor, i.e. when the axially deformable region is compressed a minimum relative displacement is induced. This is particularly important during push-pull procedures in surgeries not to impact the pushability of the entire device, as well as to maintain the torque transmission. Preferably, to maintain a high torquability and pushability, the steerable guidewire of the invention is devoid of any coiled member along the entire body 101, and in particular preferred embodiments the actuation region 140 is devoid of any coiled member. To the contrary, a tubular element is preferred in this context.

Figure 5:
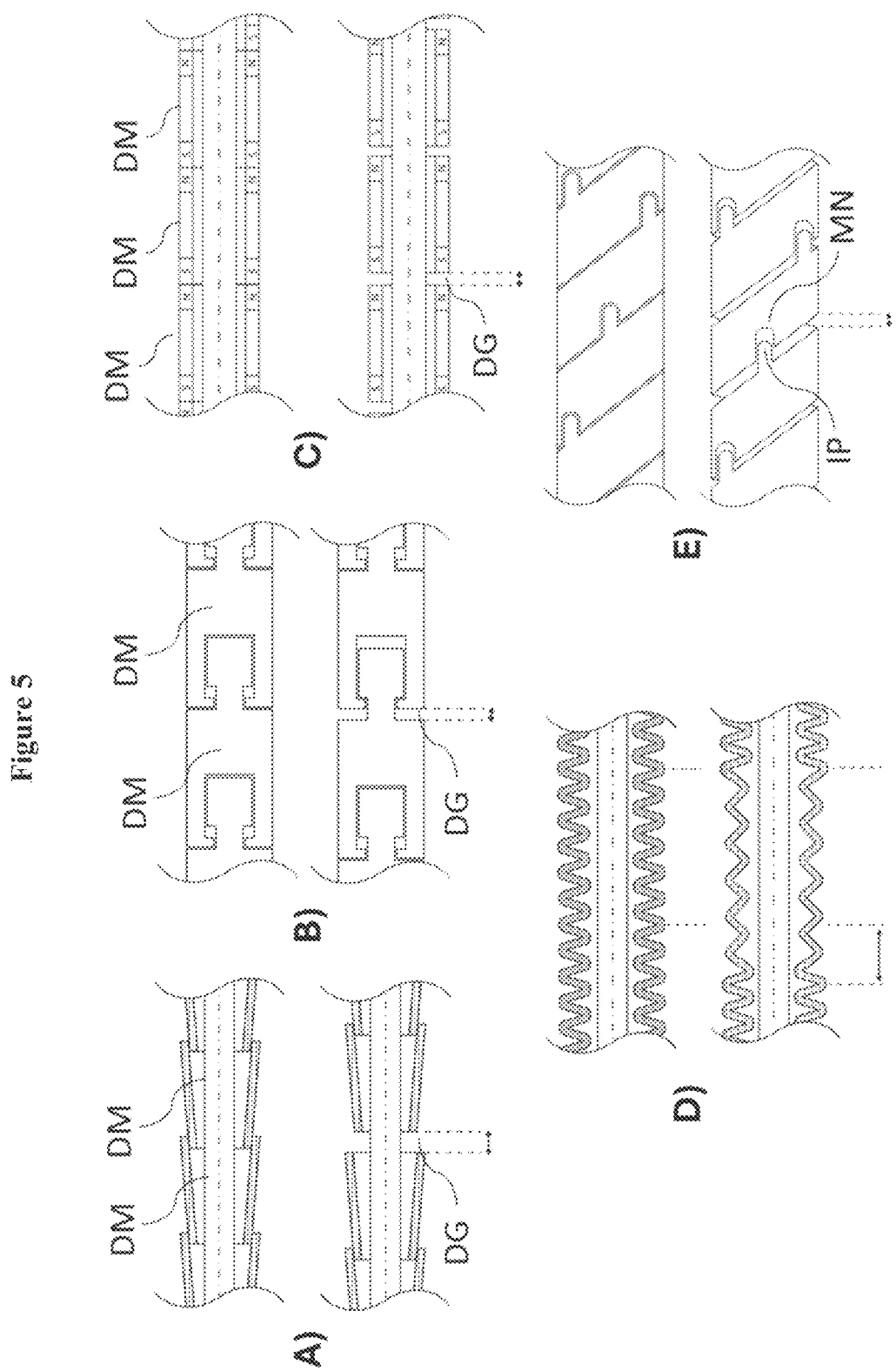
FIG. 5 shows five different embodiments of actuation regions: A) assembly comprising a plurality of interlocking members or segments; B) assembly comprising a plurality of conical or tapered members or segments; C) assembly comprising a plurality of magnetic members or segments; D) accordion-like structure elastic structure; E) ribbon elastic structure.

In some embodiments, and within the scope of the invention, the actuation region 140 is configured as to comprise at least one of an assembly of discrete members or segments and a single-body elastic structure, as exemplarily shown in FIGS. 5A to 5E. In embodiments of the invention, an assembly of discrete members or segments (DMs) includes without limitations a plurality of interlocking members or segments, a plurality of conical or tapered members or segments, a plurality of magnetic members or segments and any combinations of the foregoing (FIGS. 5A to 5C). In at least some embodiments, each of the segments DM is typically a separate and discrete structure, structurally independent from any adjacent segment or segments DM. Each of the plurality of interlocking segments are adapted and configured to interlock or otherwise connect with those segments that are adjacent thereto in a way as to inhibit rotation of adjacent segments relative to one another, while still allowing the elongation of an actuation region 140 through the disconnections of any segments or members along the longitudinal axis of the guidewire creating disconnecting gaps DG. The inhibition of rotation of adjacent segments relative to one another favors an optimal transmission of torque along the elongated tubular assembly in both rotational directions. Similarly, an assembly of conical segments or otherwise tapered members act to advantageously connected the one with the others without limiting pushability and torquability of the device.

Each of the segments DM can include interlocking means, for example crenations, teeth, serrations, bends, grooves, protrusions, notches, tongue and groove arrangements and the like, that are adapted and configured to mate with each other adjacent segments interlock in a mechanical or frictional manner to inhibit rotation of adjacent segments in relation to one another.

Any assembly can include from about ten to about five thousands of individual members. Generally, all of the segments within an assembly can be of uniform length, and the total length of the assembly can be in the range of about 100 microns to about 5 centimeters.

In embodiments of the invention, an actuation region 140 having a single-body elastic structure includes without limitations an accordion-like structure, a ribbon structure or combinations thereof (FIGS. 5D and 5E). Those structures are characterized by an unidirectional elastic behavior and an excellent torque transmission deriving from their intrinsic nature, particularly their structure, and are therefore highly adapted to be included into actuation regions according to the invention. With regards to a ribbon structure, this preferably includes protrusions IP along its length, or "fingers", interlocking with a matching notch MN on an opposed side of the ribbon. Such a configuration allows at the same time an optimal stretchability upon actuation as well as an excellent, lossless bi-directional torque transmission.

Figure 6:
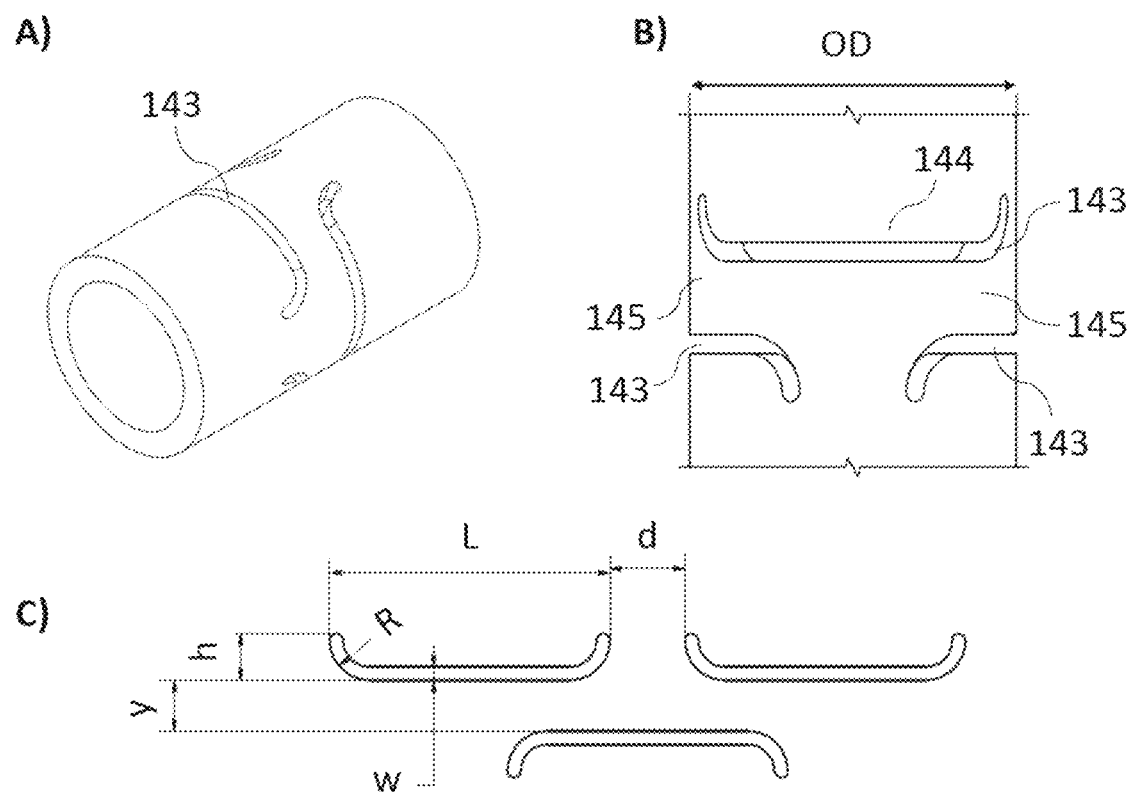
FIG. 6 depicts one alternative embodiment of an actuation region according to the invention, comprising a plurality of extendible non-compressible "mustache" motifs: A) isometric view; B) perpendicular and wrapped view; C) flattened view.
Figure 7:
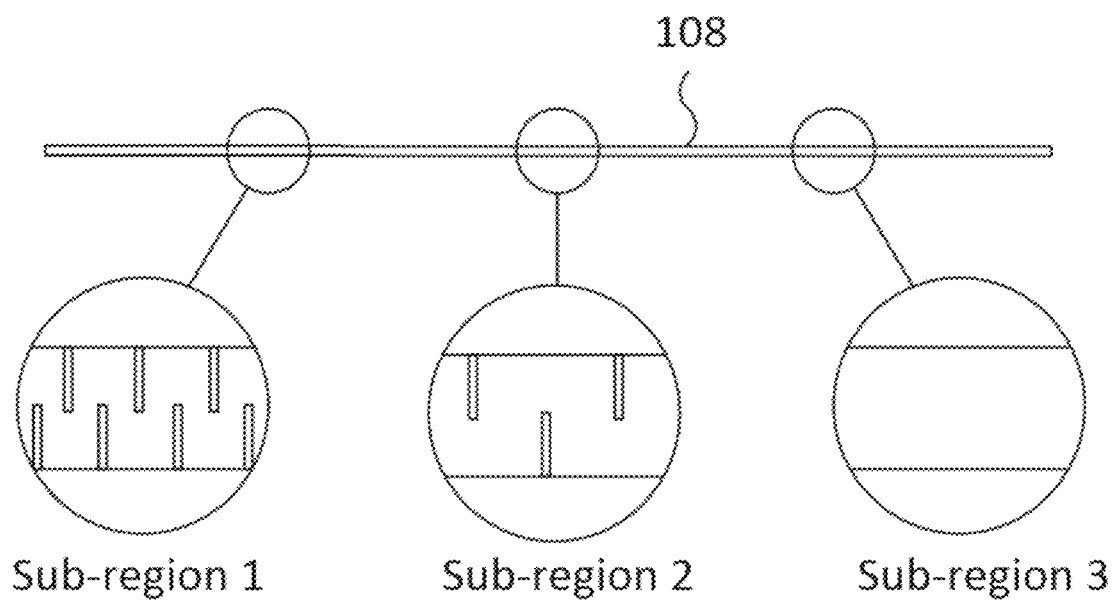
FIG. 7 depicts one embodiment of an intermediate region of the guidewire of the invention, comprising three sub-regions having different flexibilities.

In one particular embodiment, the steerable guidewire of the invention comprises an actuation region 140 having throughout cuts or motifs 143 configured to both allow the longitudinal elongation and hinder the longitudinal compression of said actuation region 140 in an optimized fashion. According to this configuration, the proximal end 101 is embodied as a tubular member patterned with said plurality of throughout cuts or motifs 143 spanning through the thickness of the tubular member. The cut-out shapes 143 are rationally designed to be as much as possible extensible and non-compressible at the same time, in such a way to allow a relative extension of the proximal end 101 in a designated region (actuation region 140) while restricting compression thereof. Because of this configuration and of the presence of a solid-bodied, tubular-membered proximal end 101, torque transmission is optimized as well. Preferably, said throughout cuts or motifs 143 comprise a portion substantially perpendicular to the longitudinal axis of said guidewire (with regards to the external wall of the proximal end 101). Still more preferably, said throughout cuts or motifs 143 further comprise a portion substantially parallel to the longitudinal axis of said guidewire (with regards to the external wall of the proximal end 101). This embodiment is exemplarily depicted in FIGS. 6A to 6C, in which a so-called "mustache" motif 143 is depicted in an isometric view of a portion of the actuation region 140, representing the extreme design optimization for said region of the guidewire concerning the concomitant combination of elastic extension, torquability and stiffness.

In a particular embodiment, when an actuation region 140 comprises a plurality of mustache motifs 143, the pull wire 106 can be a multi-filament wire designed to transmit in turn a compression and an extension force on the spatially reconfigurable region 104, thus allowing a two-direction, in plane tip deflection. This is possible thanks to a light compression of the actuation region 140, which is possible thanks to the specific design of the mustache motifs.

As shown in FIGS. 6A to 6C, two adjacent cut-outs 143 and 143' form a beam 145 that can bend and therefore procure a longitudinal displacement; accordingly, the cut-out shapes perfect the distribution of the stress throughout the proximal end 101 structure to avoid stress points that could lead to mechanical failure. The cut-out 143 defines a compression stop 144 that is characterized by the parameters w, h and R, as depicted in FIG. 6C, with w smaller to a certain extend than h and R and providing for a limited longitudinal displacement that is limited to the value of its size. In order to reach optimal performances, the relationships listed in following Table 1 have to be preferably maintained:

TABLE 1 cut-outs features and relationships in the actuation region

| Dimension | Range |
| --- | --- |
| Outer Diameter (OD) | From about 0.1 to about 1.1 mm |
| Inner Diameter (ID) | From about 0.3 of OD to about 0.95 of OD |
| Perimeter (p) | $\pi \cdot OD$ |
| L | From about 30% of p to about 50% of p |
| d | From about 2% of p to about 20% of p |
| y | From about d/3 to about 3d |
| R | From about y/3 to about 3y |
| w | From about 0.005 μm to about R/2 |
| h | From about R to about 3R |

The guidewire of the invention further comprises an intermediate region tubular element 108 on said body 101 located between said spatially reconfigurable region 104 and said proximal end 100 (FIGS. 1A to 10). The intermediate region 108 of the guidewire connects the proximal region 100 and the distal end 102, providing a link between the actuation region 140 (proximal) and the deflectable region 104 (distal tip) while imparting to the entire device specific functions and performance.

The intermediate region is designed and conceived to fulfill the following characteristics: 1) providing support to guide a catheter device efficiently up to a targeted area; and 2) offering optimum torque transmission and tailored pushability/flexibility from an actuation region to the distal tip of the device. In one embodiment, in order to achieve the above results, the distal end portion 102 and said tubular element 108 form together a monolithic element, particularly in those cases where the entire body 101 does not form a monolithic, tubular element.

In some embodiments, region 108 can be a tube, a slotted tube or preferably a combination thereof. A combination of these sub regions is schematically presented for instance in FIG. 7. Accordingly, in embodiments of the invention, the intermediate region 108 comprises a plurality of throughout cuts or motifs 300 extending through the thickness of said tubular element 108, said motifs 300 being configured to create one or more patterns locally changing the stiffness of said element 108. Such a configuration may contribute to locally changing the stiffness of the guidewire, and of the intermediate region 108 in particular, in a controlled manner. In particular, a rigid sub-region providing high support is often desired on a proximal side of the region 108 (sub-region 3), while (a) more flexible region(s) is (are) preferred distally for improving navigability when used in endovascular applications (sub-regions 1 and 2).

A particular embodiment is depicted in FIGS. 8A and B, wherein the intermediate region 108 is embodied as a solid tubular member comprising radially aligned strait slits 300 separated by rings 301. Particularly, the spacing and disposition of the cut outs 300 offer the possibility to establish a gradient of stiffness and a flexibility transition in order to reduce the concentration of a high stress in the material that would lean towards a mechanical failure. Typically, slits 300 are formed part way through tubular member 108, leaving axial beams or segments 302 joining rings 301.

Figure 8:
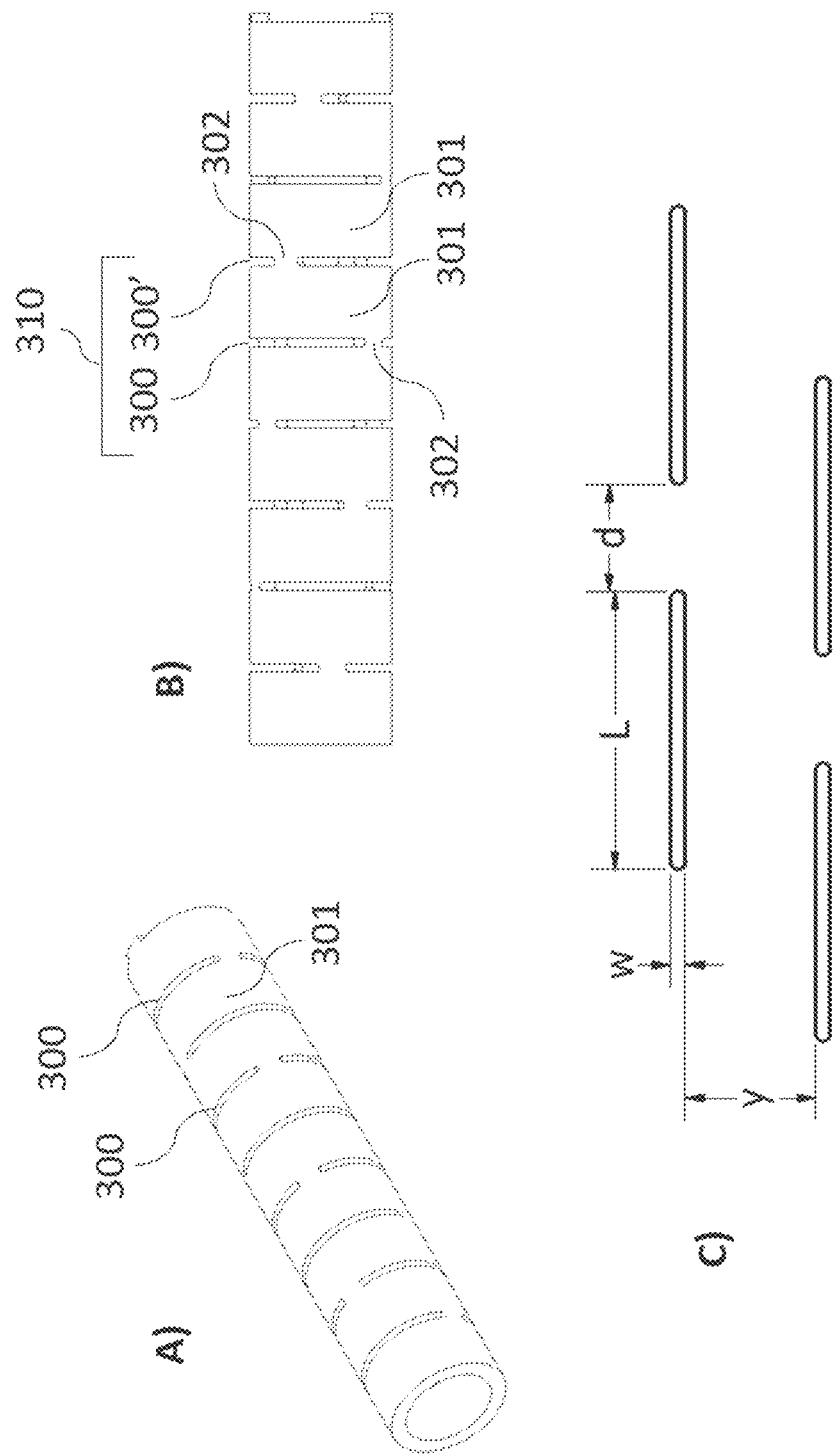
FIG. 8 depicts one embodiment of an intermediate region of the guidewire of the invention in which a plurality of cut-outs or motifs are present: A) Isometric view; B) side view; C) flattened, unwrapped view of the motifs.

Slits 300 may be formed in groups of two, three, or more slits 300, which may be located at substantially the same location along the axis of intermediate region 108, and may be substantially perpendicular to the axis. FIG. 8 illustrates an exemplary embodiment having groups 310 of two slits 300 and 300' each. A ring 301 is formed between any two adjacent groups of slits 300 and 300', and adjacent rings 301 are attached by a number of segments 302 equal to the number of slits in a group. With groups of two slits 300 and 300', bending of tubular member 108 may result from distortion of segments 302, rings 301, or both, thus reducing fatigue on the entire structure.

Adjacent slits 300 may be patterned so that axial beams or segments 302 are rotated by an angle relative to each other about the axis of tubular member 108. The angle of rotation can change along the length of the member 108 at any given position, and can be set to create patterns such as helical patterns to specifically tailor the stiffness of the intermediate region 108. Additionally, helical patterns represent a mean to optimize manufacturing process and related costs.

In general, in embodiments having groups of two slits, the angle of rotation may be 180 degrees plus or minus no more than 40 degrees, that quantity divided by two (the number of slits in the group). In other words, the angle of rotation may be within the range of 140 to 220 degrees divided by two. In other embodiments, the angle of rotation may be 180 degrees plus or minus an angle between 1 and 25 degrees, that quantity divided by two. In other embodiments, the angle of rotation may be 180 degrees plus or minus no more than 5 degrees, that quantity divided by two. In some embodiments, the angle of rotation may be slightly more or slightly less than the angle values given above. Thus, segments 302 may be a slight angle from lining up with the midpoint of slits 300 in adjacent groups. This slight angle may be, for example, 1 to 20 degrees for groups 310 of two slits 300 and 300' each. The same calculations are applicable, mutatis mutandis, to groups of slits of three or more. In some embodiments, slits 300 may be substantially equally spaced around the axis. However, in some embodiments, slits 300 may be spaced unequally around the axis, may be of unequal sizes, or both.

Slits 300 may be formed by cutting or grinding, for example, with a semiconductor dicing blade or lasers. For instance, each slit 300 in a group may be cut in turn by rotating tubular member 108. Then tubular member 108 may be advanced axially, rotated the desired amount, and the axially adjacent group of slits 300 may be cut. In some embodiments, slits 300 are cut out with an angle α relative to the longitudinal axis of the region 108, following an imaginary spiral path wrapped around the perimeter of the region 108. The angle α can be comprised between typically 1 and 45 degrees, such as between 5 and 40 degrees, or between 10 and 30 degrees. This embodiment is particularly advantageous for what concerns automated manufacturing, drastically reducing the production time.

In order to reach optimal performances, the relationships listed in following Table 2 have to be preferably maintained:

TABLE 2

| cut-outs features and relationships in the intermediate region | |
|---|---|
| Dimension | Range |
| Outer Diameter (OD) | From about 0.1 to about 1.1 mm |
| Inner Diameter (ID) | From about 0.3 of OD to about 0.95 of OD |
| Perimeter (p) | π · OD |
| L | From about 30% of p to about 50% of p |
| d | From about 2% of p to about 20% of p |
| y | From about d/3 to about 3d |
| w | From about 0.005 μm to about OD/2 |

A steerable guidewire according to the invention can be fabricated to have diameters ranging from about 0.007 inches to about 0.038 inches. The external diameter of the guidewires will of course be a function of the intended application. For instance, a steerable guidewire according to the invention intended for coronary angioplasty has preferably an external diameter in the range of from about 0.014" to about 0.018".

The guidewire of the invention can come in various stiffnesses, and its length can range from about 50-cm to about 350-cm or longer. Typical guidewire for cardiovascular use have diameters in the range of 0.007" to 0.018" to 0.025", a length in the range of 100 to 300 cm, and a tip stiffness of 1 to 10 grams for access to unoccluded vessels, and 10 to 30 grams for crossing occluded or stenosed vessels. Tip stiffness is measured by the amount of force/weight needed to deflect the tip by 45%. Peripheral and neurovascular guidewires are in the range of about 0.007" to 0.014" and less often 0.018" to 0.035" while having various tip stiffness depending on their function. A key advantage of the inventive concept behind the invention relies in the presence of a reinforcement structure 107 that minimally alter the entire structure of a guidewire, rendering even very thin wires adapted to deflect without the need of bulky apparatuses or actuation mechanisms.

For some applications, such as coronary access, the distal end 102 will be floppier (have a lower stiffness) than the body 101 of the guidewire, while in other applications, such as aortic access or CTO (Chronic Total Occlusion) crossing, the distal end 102 elongated body 101 may have substantially similar stiffness, without impairing its ability to actively deflect. The distal end 102 may extend 0.5 to 10 cm from the distal tip, and is typically in the range of 1 to 3 centimeters.

In some embodiments, the exterior surface of the device is entirely or partially equipped with an elastic or otherwise compliant, biocompatible coating or sheath to provide a smooth outer surface hydrophobic or hydrophilic, depending on the needs and circumstances. Suitable coatings can be formed by dipping, spraying or wrapping and heat curing operations and any other operation known in the art. A coating material is selected to minimize sliding friction of the device during insertion and removal into a subject's body, and is substantially chemically inert in the in vivo vascular environment. A variety of suitable materials are known, including, for example, polytetrafluoroethylene (PTFE), tetrafluoroethylene (TFE), urethane, polyurethane, thermoplastic polyurethanes (TPU), silicone Polyether block amide (PeBax), Nylon or polyethylene (PE). Similarly, the coating material may be selected for its hydrophilic properties thus improving gliding in blood and navigability. Typically, this kind of coating are applied at the guidewires distal tip and extends up to 50 cm from the tip.

The actuation mechanism of the actively steerable guidewire of the invention can be favored by the use of an actuator adapted to impart a distally-directed compression force on the spatially reconfigurable portion 104. This is mainly due to the physical and mechanical nature (e.g. a smooth surface), as well as the size (e.g. small diameter), of guidewires conventionally used in clinical practice, which renders their manipulation hard to be performed by hands. In this contexts, medical practitioners are used to operate guidewires with the help of small devices adapted to favour the grip and the torque of said wires, thus facilitating maneuverability thereof. A so-called torque device is used to provide a "handle" whereby the surgeon can have maximum control over the positioning and orientation of the guidewire.

Figure 20:
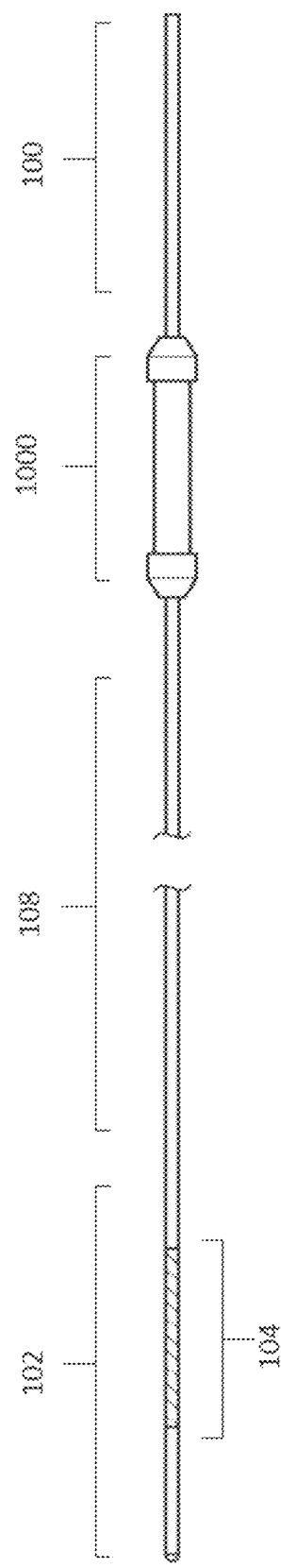
FIG. 20 depicts an overview of one embodiment of a system according to the invention, comprising the steerable device and an actuator.

Accordingly, a further object of the present invention relates to a system comprising the device 1 of the invention and an actuator 1000 adapted to impart a compression force on the spatially reconfigurable portion 104 (FIG. 20). The actuator, also referred to herein as "torque device", "torque actuator" or "torquer", features a controlling mechanism for permitting the articulation at the distal end 102 of the device of the invention, and can advantageously be releasably affixed to the proximal end 100 to follow the advancement of the device along a path, such as the endoluminal space of a blood vessel, and allowing negotiation, pushing/pulling and steering operations.

In the implementation of the invention, a plurality of non-limiting embodiments of said actuator 1000 have been developed, depicted mainly in FIGS. 12 to 18. Generally speaking, the developed torque actuator 1000 comprises:

a) a first handle 400 comprising:
an elongated body 401, a proximal end 402 and a distal end 403, said handle 400 defining a lumen 404 along its entire length, and said distal end 403 comprising means 410 for gripping and ungripping the above-described steerable device 1;

b) a second handle 500 comprising:
an elongated body 501, a proximal end 502 and a distal end 503, said handle defining a lumen 504 along its entire length, and said distal end 503 comprising means 510 for gripping and ungripping the above-described steerable device 1;

wherein the first and second handles 400 and 500 are arranged in a coaxial configuration so that they can perform a longitudinal relative displacement.

A torquer 1000 according to the invention securely holds and controls a guidewire with one hand and with smooth operation. The actuator is simple in its construction, fast to load and adjust, easily gripped and ungripped and free of jerking wire movements during operating procedures.

Figure 14:
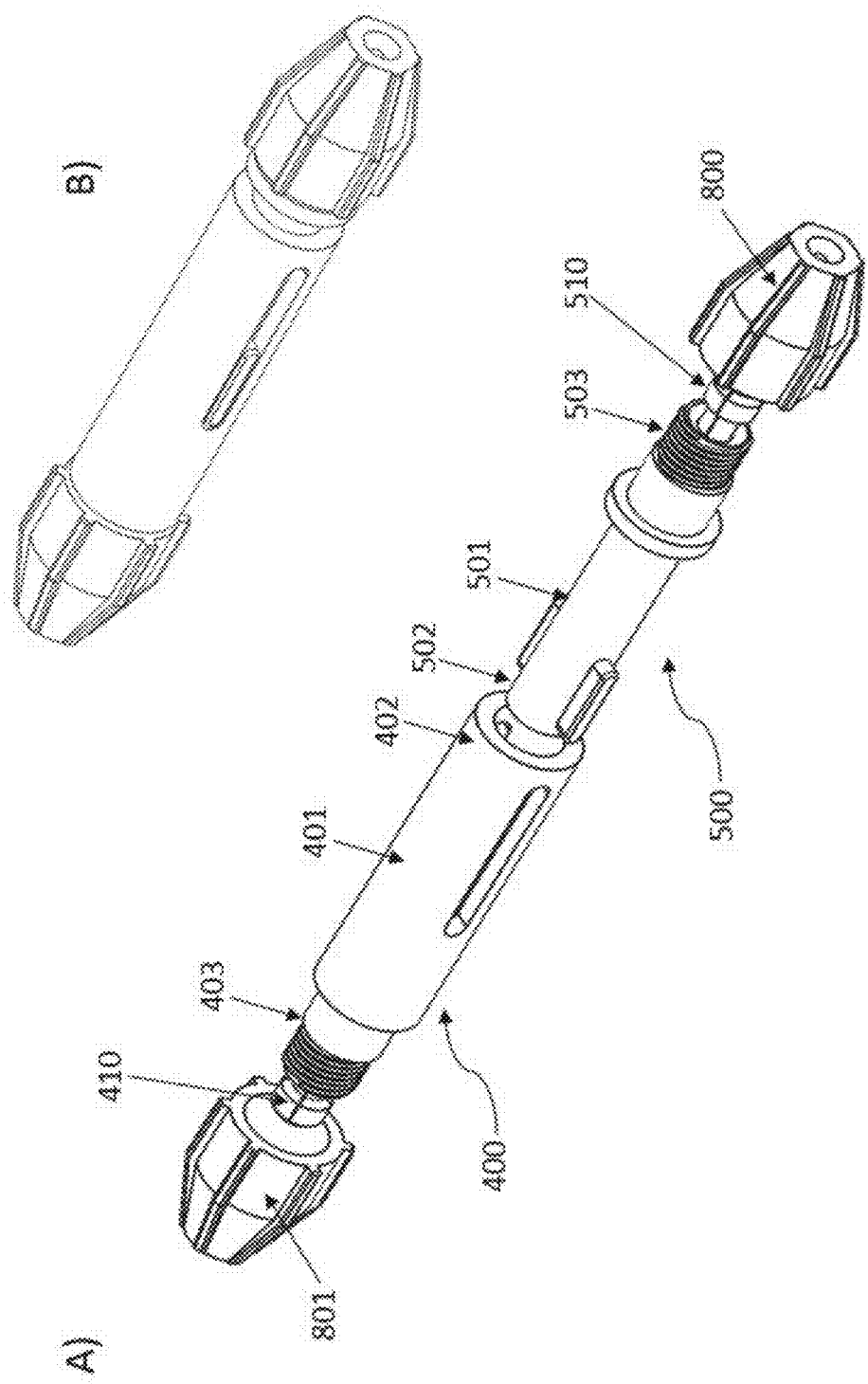
FIG. 14 shows one embodiment of the actuator: A) exploded view and B) isometric view.
Figure 15:
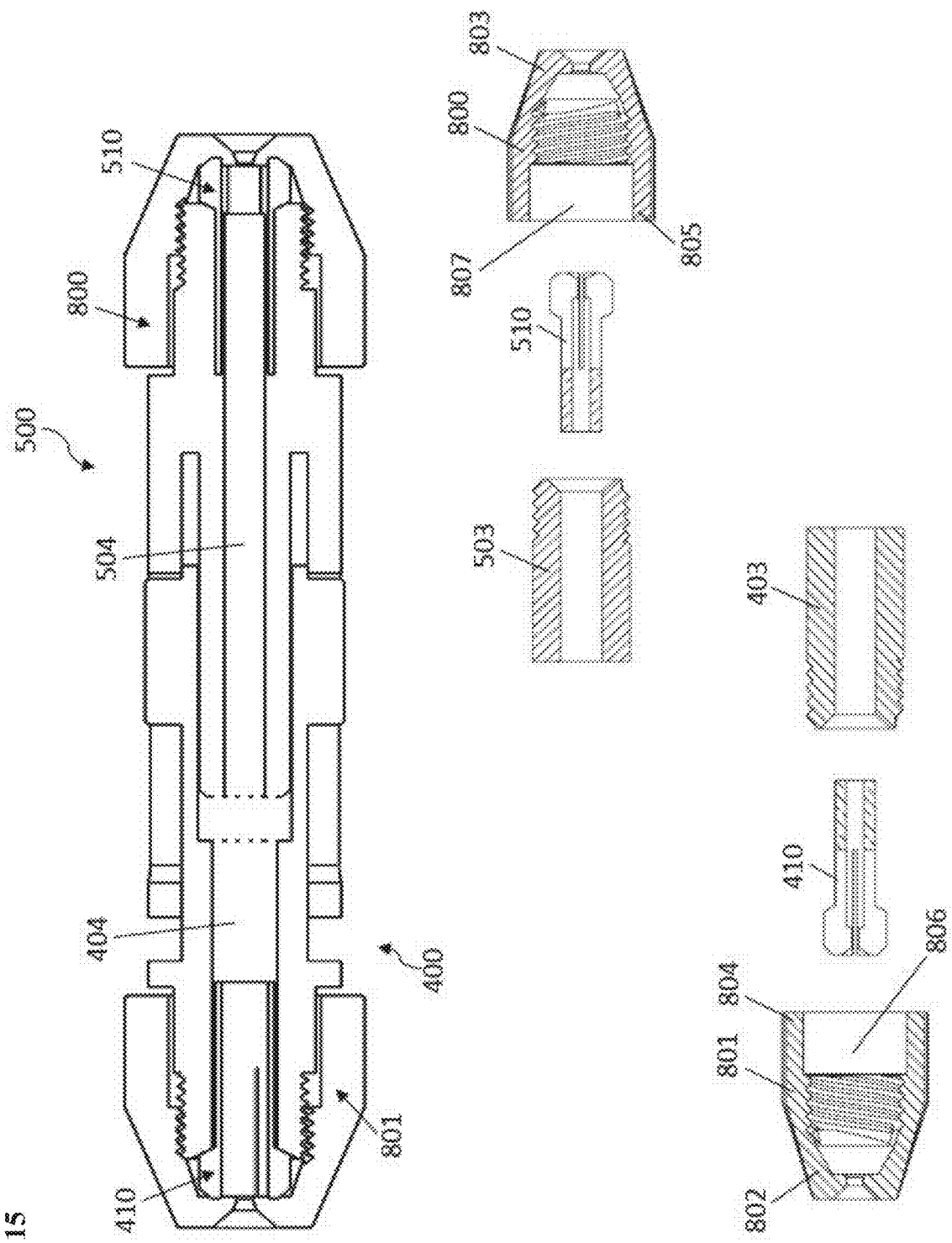
FIG. 15 shows a longitudinal cross sectional view of the actuator of FIG. 14, as well as of the fasteners.
Figure 16:
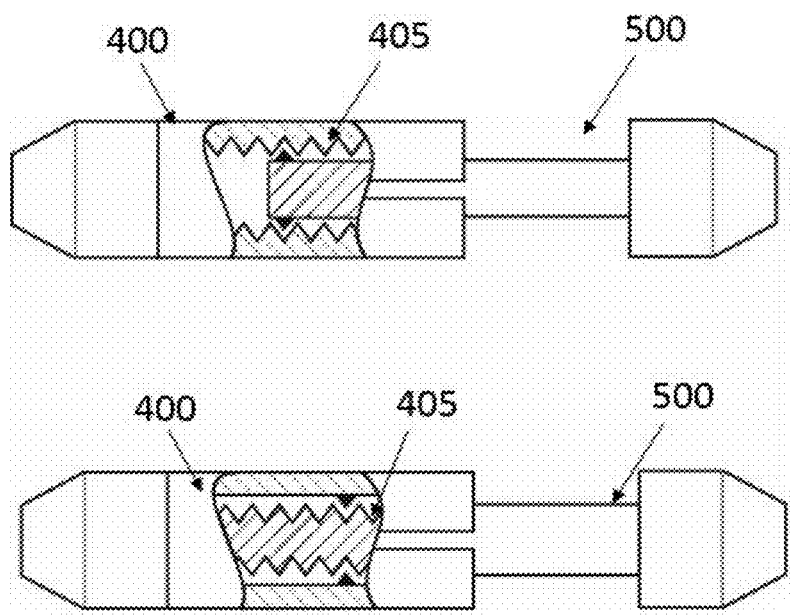
FIG. 16 shows a partial longitudinal cross sectional view of one embodiment of the actuator comprising two handles interacting by means of snaps.

The torquer 1000 is composed of two handles 400 and 500 connected or connectable between them through a variety of solutions; as a way of example, said handles 400 and 500 can be coupled and/or fixed one with respect to the other by means of an accordion-like, corrugated element 600 (FIG. 12), via a spring clip 700 (FIGS. 13A and B), or thanks to a male-female arrangement, permitting to insert e.g. handle 400 into handle 500 (FIGS. 14A and B; FIG. 15). Notwithstanding the connection setup, handles 400 and 500 are substantially coaxially arranged one with respect to the other along their longitudinal axes.

As exemplary depicted in FIGS. 14A and B and FIG. 15, an interior long axial channel or lumen (404, 504) extends between the proximal end (402, 502) and the distal end (403, 503) through the elongated body (401, 501) of each of the first and second handles 400 and 500. An aperture formed at the proximal end (402, 502) and an aperture formed in the distal end (403, 503) provide access to the passage, and facilitate advancement, of a guidewire 1 through body. Channels or lumens 404 and 504 are substantially coaxially arranged one with respect to the other along their longitudinal axes so to create, upon connection of handles 400 and 500, a unitary passage or channel.

In preferred embodiments, gripping and ungripping means 410 and/or 510 comprise a spring collet clamp. A collet locking system comprises a chuck that forms a collar around an object to be held (in the present case, guidewire device 1) and exerts a strong clamping force on said object when it is tightened. The collet is a sleeve with an inner surface normally matching that of a guidewire and a conical outer surface. The collet can be squeezed against a matching taper such that its inner surface contracts to a slightly smaller diameter, squeezing the guidewire to hold it securely. This is achieved with a spring collet, made of e.g. spring steel, with one or more kerf cuts along its length defining at least two flanges that allow the spring collet to expand and contract. With enough compression, the collet locking mechanisms 410 and 510 exert sufficient frictional force upon the guidewire 1 such that this is "locked" relative to torque device 1000, preventing the guidewire from sliding freely within the hollow inner bores 404 and 504 of torque device 1000.

To perform said compression, in one embodiment the system further comprises a first and second tapered fasteners 800 and 801 adapted to releasably engage and tighten said gripping and ungripping means 410 and/or 510, such as a spring collect clamp, of said first and second handles 400 and 500, respectively. As shown for instance in FIGS. 14 and 15, fasteners 800 and 801 are caps including a first end (802, 803) and a second end (804, 805), with a hollow passage extending therebetween (806, 807). An aperture formed in the first end (802, 803) and an aperture formed in the second end (804, 805) provide access to the passage and facilitate advancement of a guidewire 1 through the cap (800, 801). Hollow passages 806 and 807 are substantially coaxially arranged with respect to channels or lumens 404 and 504 along their longitudinal axes so to create, upon connection with handles 400 and 500, a unitary passage or channel. The first end (802, 803) is tapered so that, upon connection with distal end (403, 503) of a handle (400, 500), the spring collect clamp (410, 510) is locked against a wire inserted therein. Threads formed adjacent the second end (804, 805) on an interior of the fastener (800, 801) can cooperate with threads at the distal end (403, 503) of a handle (400, 500).

In one additional or alternative embodiment, said distal ends 403 and 503 of said first and second handles 400 and 500 each comprise a tapered tip adapted to engage said gripping and ungripping means 410 and/or 510 such as a spring collect clamp and tighten them upon a longitudinal relative displacement of said first and second handles 400 and 500. In this embodiment, a collet clamp 410 or 510 is designed as a tubular element coaxially arranged along its longitudinal axis within the hollow elongated body of the handle (401 or 501). The diameter of the collet (410, 510) matches the bore (401, 501) of the handle (400, 500), having the larger, distal tapered end slightly greater than the bore while the smaller, proximal diameter is slightly less than the bore. A longitudinal relative displacement of the first and second handles 400 and 500 pushes the distal ends 403 and 503 thereof against the distal, larger end of the collet 410 and 510, forcing the tapered distal end of the collet clamp (410, 510) to slide within the hollow elongated body of the handle (401 or 501), thus locking the two elements together. Upon release of the force necessary to perform the relative displacement of handles 400 and 500, the elastic spring nature of the collet (410, 510) allows this latter to be pushed outside the body (401,501), thus consequently releasing the clamping force. As it will be evident to a person skilled in the art, combinations of the above-described embodiments are also envisageable; for instance, in operation, the first handle 400 is proximally arranged compared to the operator, while the second handle 500 is distally located. The operator can fix a proximally-located anchorage point 141 by screwing the fastener 800 about the threaded distal end 403 of handle 400, so to tight the collet 410 and apply a clamping force on the device 1. In this way, the actuator 1000 can be operated as a torquer conventionally used in clinical practice; however, the distal end 503 of distally-located handle 500 can be tapered as to engage the collet 510 and automatically clamp and tighten it on an anchorage point 142 upon a longitudinal relative displacement of said first and second handles 400 and 500.

Moreover, in a further embodiment according to the invention, each of said first and second handles 400 and 500 can comprise a plurality of corrugations 405 on their inner lumen adapted to work as snaps. In this way, handles 400 and 500 can be fixed one relative to the other in defined positions depending on the needs (FIG. 14). This feature is particularly advantageous for providing a tactile feedback to the operator, for maintaining a given tip deflection during guidewire operation, and to facilitate the incremental actuation of the handles' displacement—acting in turn on the incremental deflection of the device's distal end—especially with actuators as those depicted in FIGS. 12 to 18.

Preferably, handles 400 and 500 are designed to impede or at least limiting as much as possible their relative rotation. Advantageously, handles 400 and 500 are longitudinally constrained by e.g. a guiding mechanism having grooves and guided pins, or via matching slots designed on the inner surface of their lumens.

Figure 17:
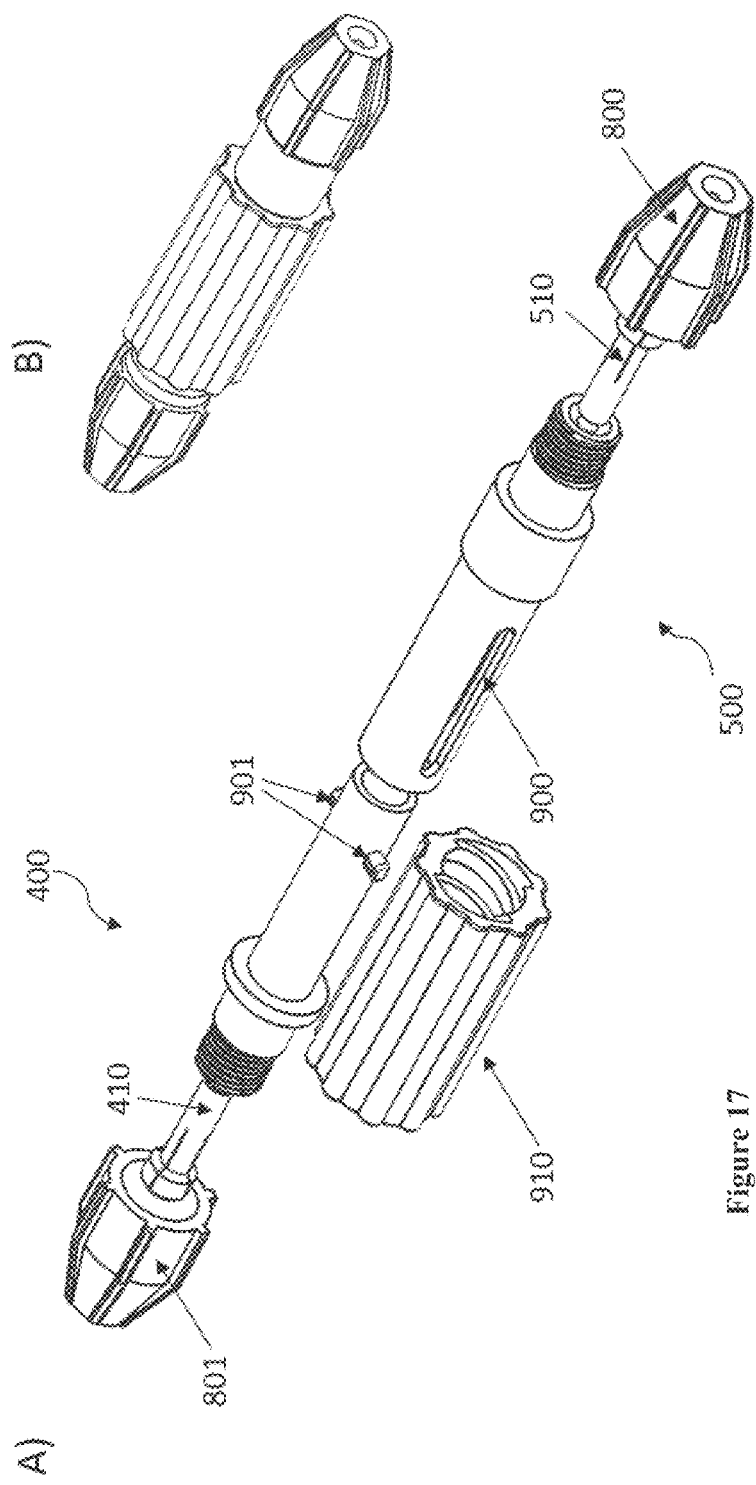
FIG. 17 shows one embodiment of the actuator comprising a gear rotational element: A) exploded view and B) isometric view.
Figure 18:
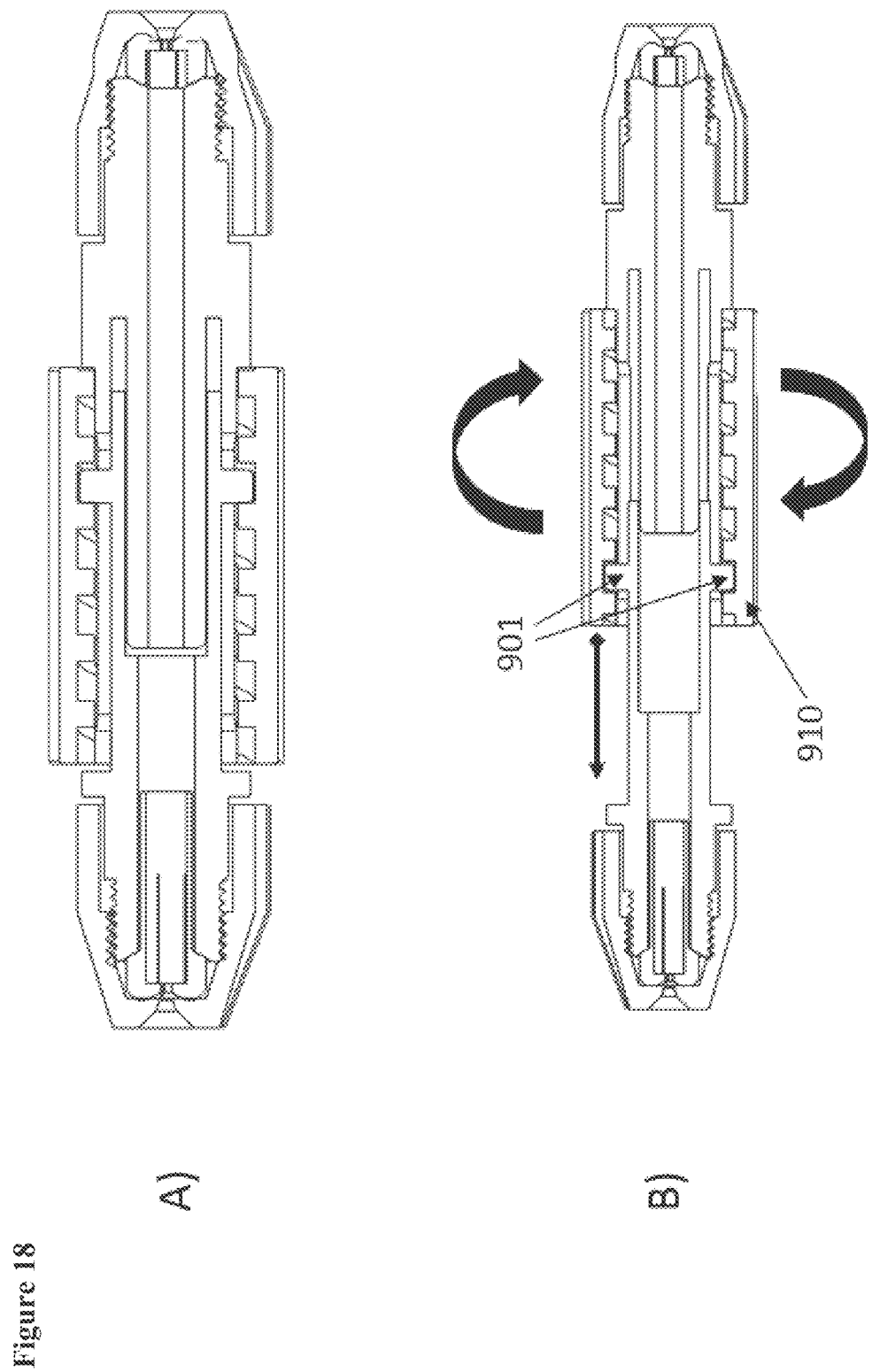
FIG. 18 shows a longitudinal cross sectional view of the actuator of FIG. 17 both in a rest position (A) or in operation (B)

In still another embodiment, one of the first or second handle 400 or 500 comprises a longitudinal slot 900 along its body, and the other of the first or second handle 400 or 500 comprises a protrusion 901 adapted to fit and slide along said longitudinal slot 900. In this context, the system further comprises a gear rotational actuator 910 adapted to engage said protrusion 901 and operate, upon rotation, a longitudinal relative displacement of said first and second handles 400 and 500 (FIGS. 17 and 18).

As a way of example, one method of use involves performing a percutaneous or cutdown procedure to gain access to structures such as, but not limited to, the vasculature, either a vein, an artery, a body lumen or duct, a hollow organ, musculature, fascia, cutaneous tissue, the abdominal cavity, the thoracic cavity, and the like. An introducer, which is usually a hollow, large diameter, hypodermic needle, and the steerable guidewire are placed within the vasculature and the steerable guidewire is advanced through the central lumen of said introducer to be routed proximate to the target treatment site. The introducer can be removed at this time or substantially at the time the guidewire is introduced into the body lumen.

Figure 19:
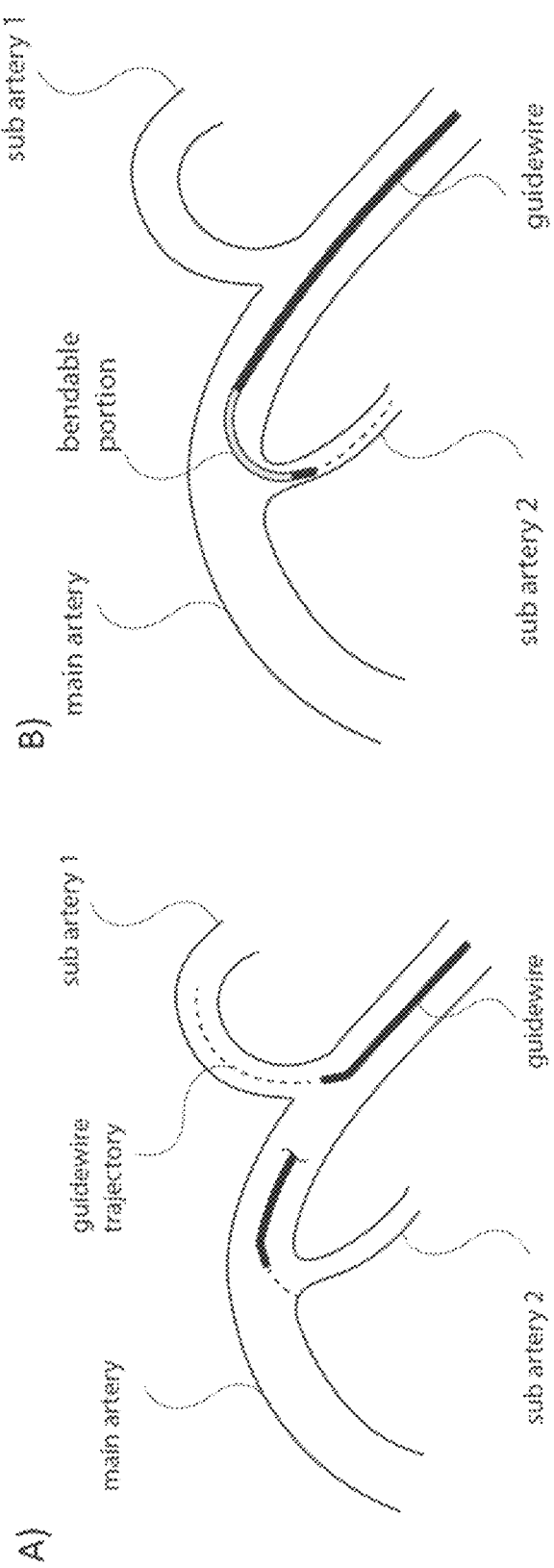
FIG. 19 shows a comparison between state-of-the-art, conventional pre-bent guidewires (A) and the device of the invention (B); notice the ability of the steerable guidewire to reach sub-arteries not reachable with classic guidewires.

The torque device 1000 is assembled or otherwise arranged so that the steerable guidewire 1 is fed within the unitary channel formed by channels 404 and 504, collet clamps' bores 410 and 510 and, whenever present, hollow passages 806 and 807 of the fasteners 800 and 801, as well as through the apertures of the foregoing. Deflection of the distal end 102 to varying degrees of curvature, under control from the proximal end 100 or body 101 of the guidewire can be performed. The curve can be oriented along the direction of a branching vessel or vessel curve so that the steerable guidewire can then be advanced into the vessel by way of its high column strength and torquability (FIG. 19).

For instance, when a branch or bend in the body vessel is reached, the first and second handles 400 and 500 are rotated and threaded into the second ends 804 and 805 on an interior of the fasteners 800 and 801 (or vice versa), so that the handles' distal ends 403 and 503 are advanced into the narrowing passage of the fasteners 800 and 801 towards the tapered portions thereof 802, 803. As distal ends 403, 503 and first ends 802, 803, respectively, converge, the flanges of spring collet clamps 410 and 510 are compressed around the guidewire to produce sufficient frictional force to grasp the guidewire, thereby locking it relative to the torque device 1000. In this configuration, the torque device 1000 is therefore in a closed position and advancement of the guidewire through it is impeded. The user can exploit the torque device 1000 as a handle to easily manipulate the guidewire (e.g. twisting and/or laterally move it).

Figure 21:
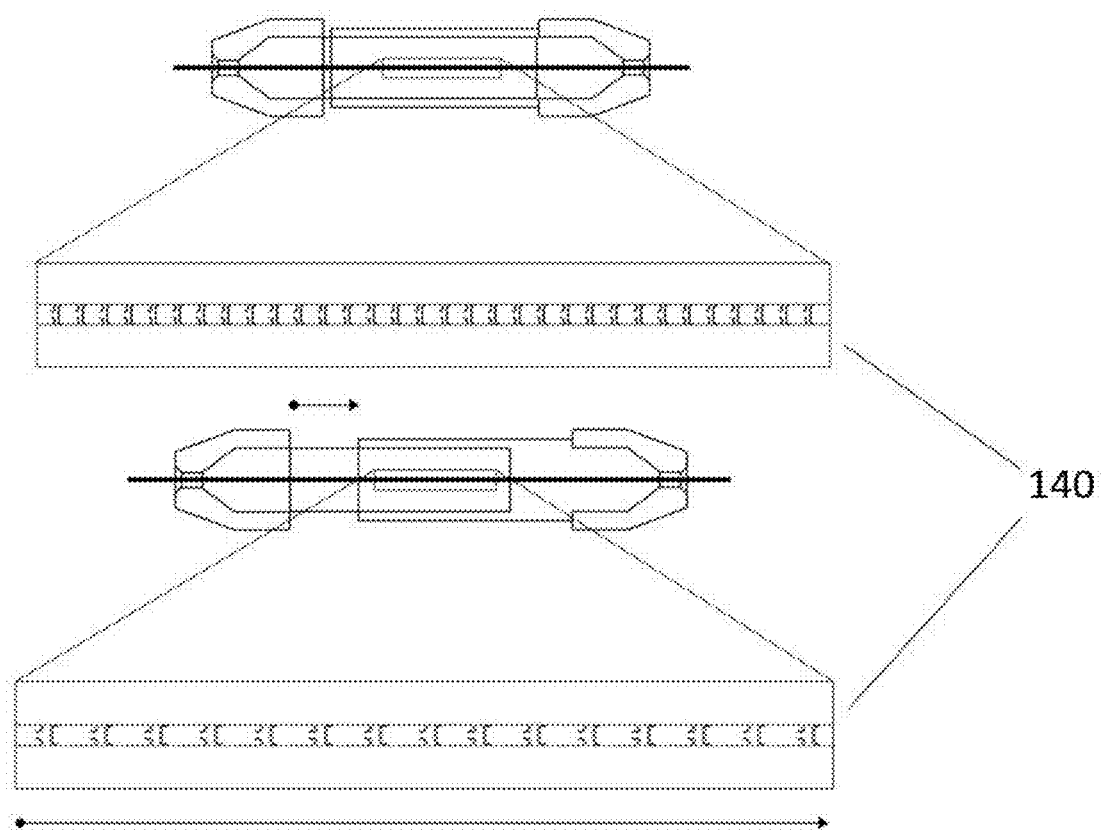
FIG. 21 depicts the actuator-driven actuation of the device of the invention, in which a distally-directed compression force imparted on an actuation region of the device allows deflection thereof.

At this point, a relative displacement between first and second handles 400 and 500 can be performed by the user (FIG. 21). A connection element between said first and second handles 400 and 500, such as an accordion-like, corrugated element 600 (FIG. 12), a spring clip 700 (FIGS. 13A and B) or longitudinal slot 900/protrusion 901 coupled by a gear rotational actuator 910 (FIGS. 17 and 18), is operated by the user to move away first and second handles 400 and 500 along their common longitudinal axis. Being the torque device 1000 anchored on the proximal end 100 or the body 101 of the guidewire on two anchor points 141 and 142 via its first ends 802 and 803, the displacement of the handles on the designated actuation region 140 imparts a compression force on the spatially reshapeable portion 104, that in turn collapses the hollow spaces 103' in the stress relief portion 120 of the guidewire's region 104, bringing the stress relief elements 103 closer together and permitting the device's bending towards the target vessel or capillary. The surgeon can also release the stress tension when convenient. To do so, the first and second handles 400 and 500 are moved back in the initial position by acting on the connection element (e.g., spring clip 700 or gear rotational actuator 910). The fasteners 800 and 801 can be, at this point, unscrewed from distal ends 403 and 503 to allow the guidewire to be fed through the torquer 1000. Once the guidewire is in the desired location and advancement through the body vessel is complete, the torque device 1000 may be opened and slidably removed from the guidewire by its proximal end. Once the guidewire is in place, the surgeon can further proceed with the endovascular procedure.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A steerable guidewire for insertion into a body cavity, wherein the steerable guidewire comprises:
   a) an elongated body defining a longitudinally-arranged lumen comprising:
      i) a proximal end portion,
      ii) a distal end portion comprising a spatially reconfigurable portion and a tip; and
      iii) an intermediate region tubular element located between said spatially reconfigurable portion and said proximal end,
   b) a pull wire located along said lumen and affixed to said distal end portion and to said proximal end;
   the proximal end portion of the elongated body comprising an elastic actuation region adapted to impart an indirect longitudinal tension force on the pull wire resulting in a compression force to the spatially reconfigurable portion; and
   wherein said elastic actuation region comprises first throughout cuts or motifs configured to both allow longitudinal elongation and hinder longitudinal compression of said elastic actuation region, wherein said first throughout cuts or motifs further comprise a portion substantially parallel to a longitudinal axis of said guidewire with regard to an external wall of the proximal end.

2. The steerable guidewire of claim 1, wherein said spatially reconfigurable portion comprises a reinforcement structure located on one lateral side and a flexible, stress relief portion located on an opposed lateral side.

3. The steerable guidewire of claim 2, wherein said reinforcement structure is an integral part of the elongated body.

4. The steerable guidewire of claim 2, wherein said stress relief portion comprises a plurality of cut-outs positioned on one lateral side of the spatially reconfigurable portion.

5. The steerable guidewire of claim 1, wherein said elastic actuation region is devoid of any coiled member.

6. The steerable guidewire of claim 1, wherein said elongated body is a monolithic element.

7. The steerable guidewire of claim 1, wherein said distal end portion and said intermediate region tubular element together form a monolithic element.

8. The steerable guidewire of claim 1, wherein said first throughout cuts or motifs comprise a portion substantially perpendicular to a longitudinal axis of said guidewire.

9. The steerable guidewire of claim 8, wherein said first throughout cuts or motifs further comprise a portion substantially parallel to the longitudinal axis of said guidewire.

10. The steerable guidewire of claim 1, wherein said elastic actuation region comprises at least one of an assembly of discrete members or segments and a single-body elastic structure.

11. The steerable guidewire of claim 1, wherein the guidewire comprises a plurality of second throughout cuts or motifs extending through a thickness of said intermediate region tubular element configured to create one or more patterns locally changing a stiffness of said intermediate region tubular element.

12. A system comprising the device of claim 1 and an actuator adapted to impart a tension force on the pull wire resulting in a distally-directed compression force to the spatially reconfigurable region.

13. The steerable guidewire of claim 1, wherein the portion extends along a direction substantially parallel to the longitudinal axis and the first cuts or motifs further include another portion which extends along a direction substantially perpendicular to the longitudinal axis of said guidewire.

14. The steerable guidewire according to claim 13, wherein said first throughout cuts or motifs comprise a plurality of mustache cuts or motifs.

15. The steerable guidewire according to claim 1, wherein the pull wire is enclosed along its entire longitudinal length by said elongated body.

16. The steerable guidewire according to claim 1, wherein an affixation point of the pull wire to the proximal end is arranged proximally relative to the elastic actuation region.

17. The steerable guidewire according to claim 1, wherein the elastic actuation region comprises a first longitudinally placed anchor point and a second longitudinally placed anchor point which are displaceable relative to each other by a torque actuator which can be releasably affixed to the proximal end to impart the indirect tension force on the pull wire.

18. A system comprising a torque actuator and a steerable guidewire for insertion into a body cavity, wherein the steerable guidewire comprises:
   a) an elongated body defining a longitudinally-arranged lumen comprising:
      i) a proximal end portion,
      ii) a distal end portion comprising a spatially reconfigurable portion and a tip; and
      iii) an intermediate region tubular element located between said spatially reconfigurable portion and said proximal end,
   b) a pull wire located along said lumen and affixed to said distal end portion and to said proximal end;
   said proximal end portion comprising an elastic actuation region adapted to impart an indirect tension force on the pull wire resulting in a compression force to the spatially reconfigurable region; and
   wherein said elastic actuation region comprises first throughout cuts or motifs configured to both allow longitudinal elongation and hinder longitudinal compression of said elastic actuation region; and
   wherein the torque actuator is configured to grip two spaced-apart sections of the steerable guidewire, wherein an intermediate region is defined between the two spaced-apart sections, the elastic actuation region being at least partially arranged within the intermediate region, and wherein the torque actuator is configured to longitudinally displace a first longitudinally placed anchor point of the elastic actuation region relative to a second longitudinally placed anchor point of the elastic actuation region.

19. The system according to claim 18, wherein the torque actuator comprises
   a first handle comprising a first elongated body, a first proximal end and a first distal end, wherein the first handle defines a first lumen along its entire length and comprises first gripping means for gripping and ungripping the steerable guidewire, and
   a second handle comprising a second elongated body, a second proximal end, and a second distal end, wherein the handle defines a second lumen along its entire length and comprises second gripping means for gripping and ungripping the steerable guidewire;

wherein the first and second handles are arranged in a coaxial configuration so that they can perform the longitudinal relative displacement.

\* \* \* \* \*